United States Patent [19]
Phillips et al.

[11] 3,779,410
[45] Dec. 18, 1973

[54] MECHANIZED GUM BASE PAN UNLOADER

[75] Inventors: Michael Phillips, North Brunswick; Victor A. Jurow, Freehold, both of N.J.

[73] Assignee: L. A. Dreyfus Company, South Plainfield, N.J.

[22] Filed: Aug. 17, 1971

[21] Appl. No.: 172,451

[52] U.S. Cl............... 214/311, 107/57 D, 214/1 Q, 214/16.4 R, 214/308
[51] Int. Cl............................................ B65g 65/00
[58] Field of Search.................... 214/300, 302, 308, 214/311, 315, 314, 16.4 C; 107/57 D

[56] References Cited
UNITED STATES PATENTS

| | | | |
|---|---|---|---|
| 2,569,393 | 9/1951 | Walker | 214/16.1 CE |
| 3,141,560 | 7/1964 | Rink | 214/16.4 R |
| 2,561,775 | 7/1951 | Bausman | 214/311 |
| 2,931,483 | 4/1960 | Gibbons | 214/16.4 C |
| 2,609,944 | 9/1952 | Nicoletti | 214/308 |
| 2,640,444 | 6/1953 | Reget | 214/311 |

Primary Examiner—Gerald M. Forlenza
Assistant Examiner—Lawrence J. Oresky
Attorney—LeBlanc & Shur

[57] ABSTRACT

Disclosed is a machine for automatically unloading chewing gum base materials from cooling pans or trays. A carriage is indexed vertically into a pit in the factory floor and pans supported at their upper edges by flanges in the carriage have their undersides successively engaged by a chain conveyor supported on a table in the pit so that the pans are raised and propelled laterally by the conveyor out of the carriage. The pans are inverted, lifted and vibrated to separate the gum base from the pans. The pans are then coated with a release agent, reinverted and reloaded into the carriage as it moves upwardly out of the pit. The carriage is horizontally indexed so that several banks of pans may be unloaded, emptied and reloaded.

22 Claims, 23 Drawing Figures

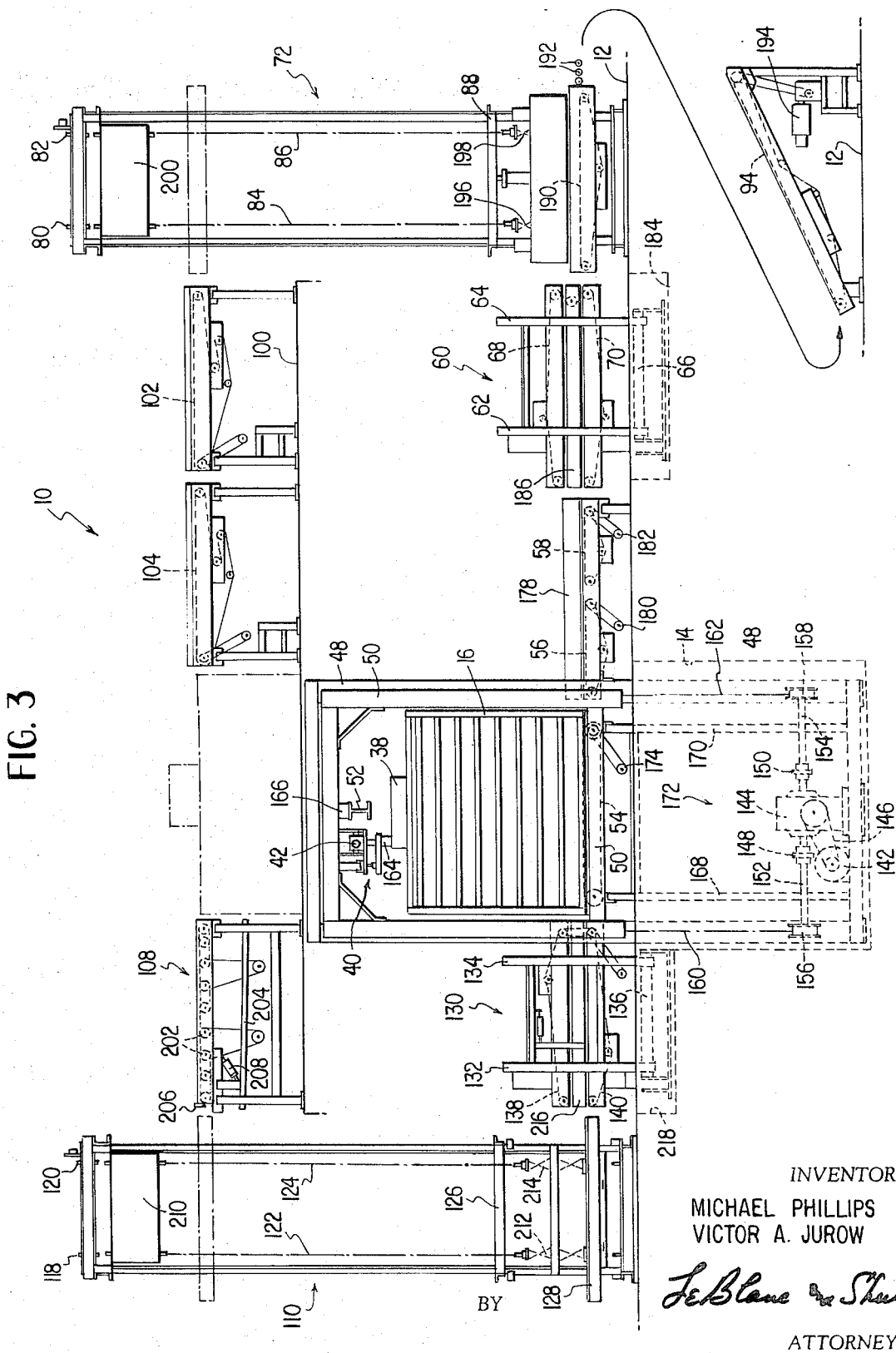

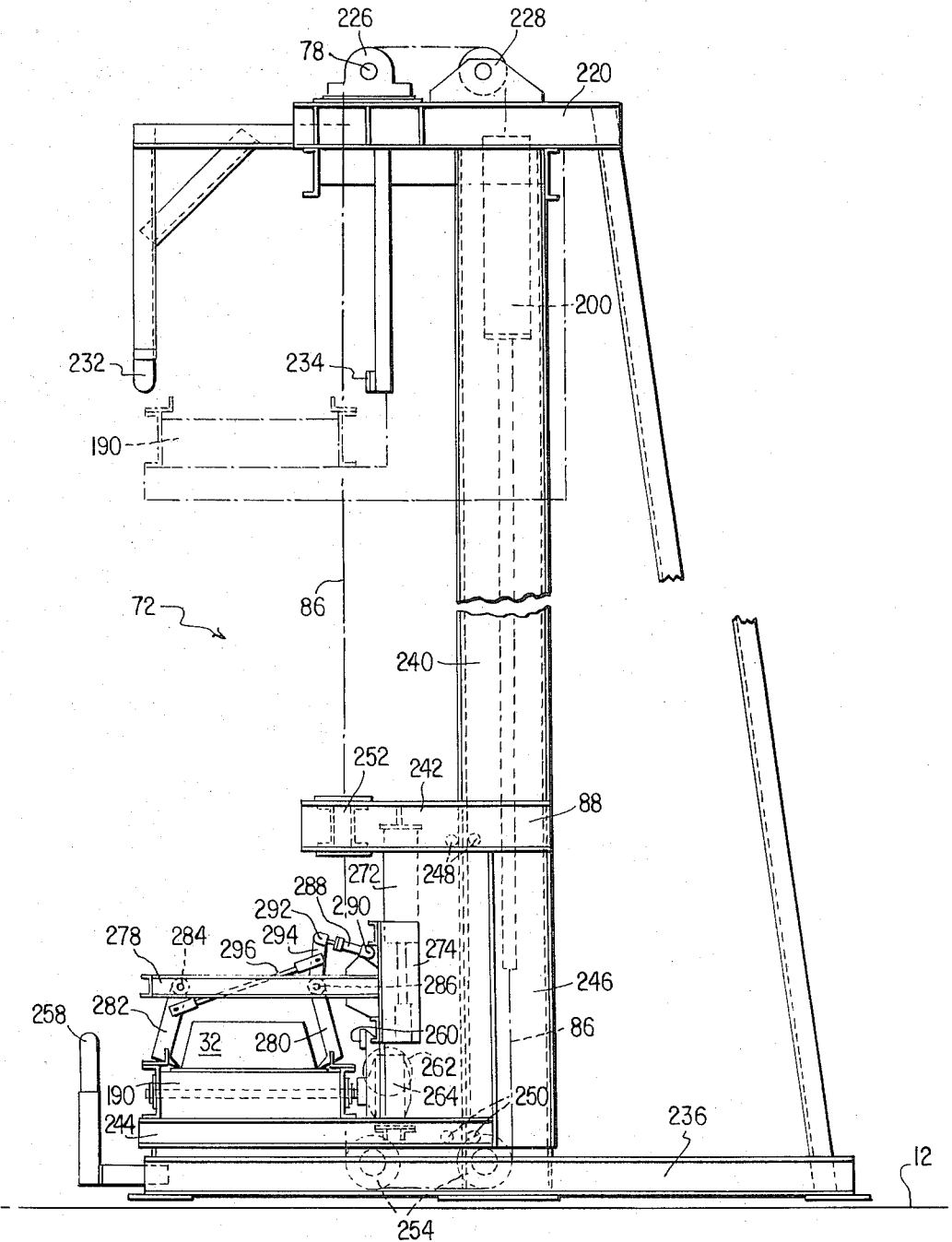

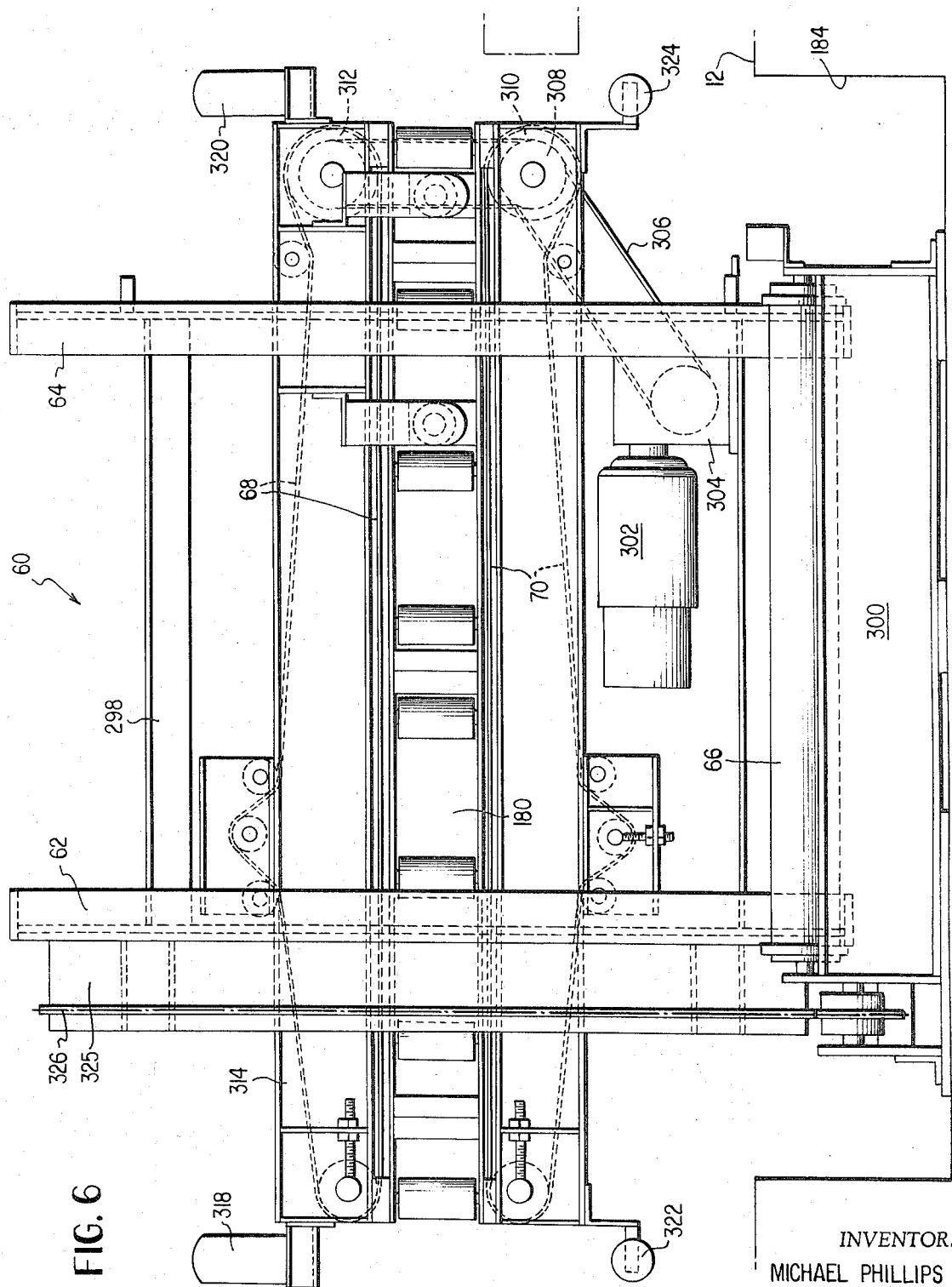

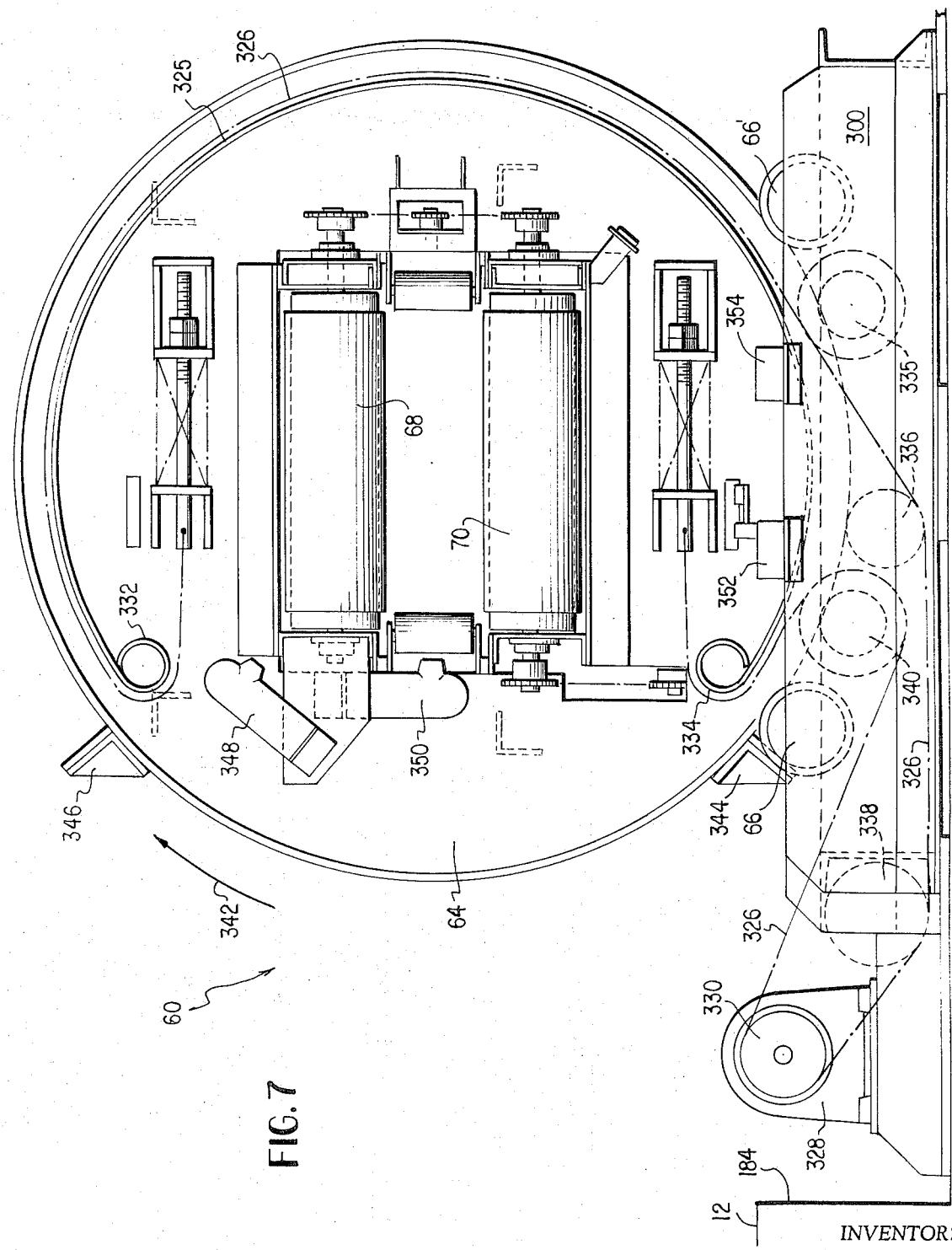

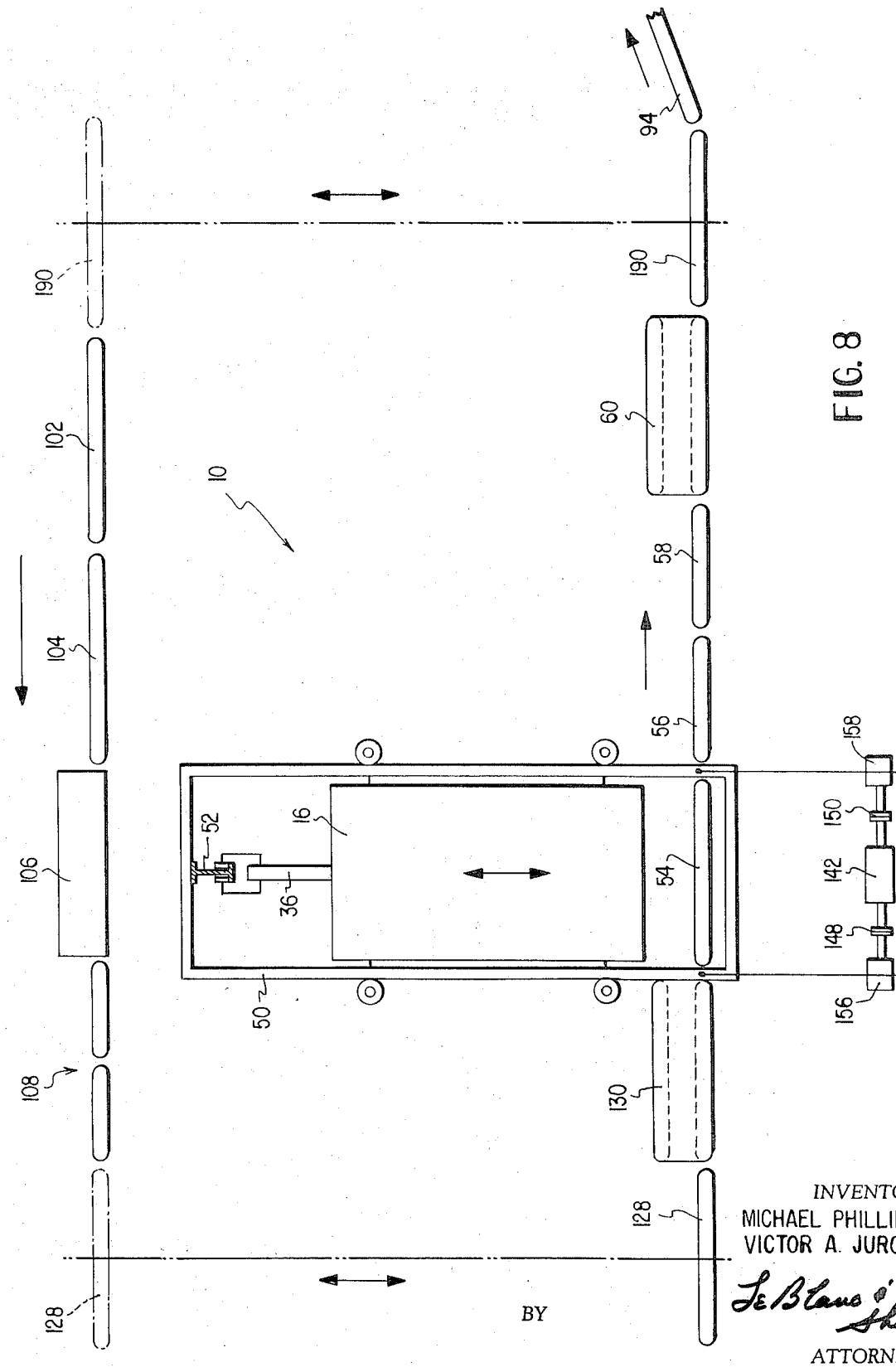

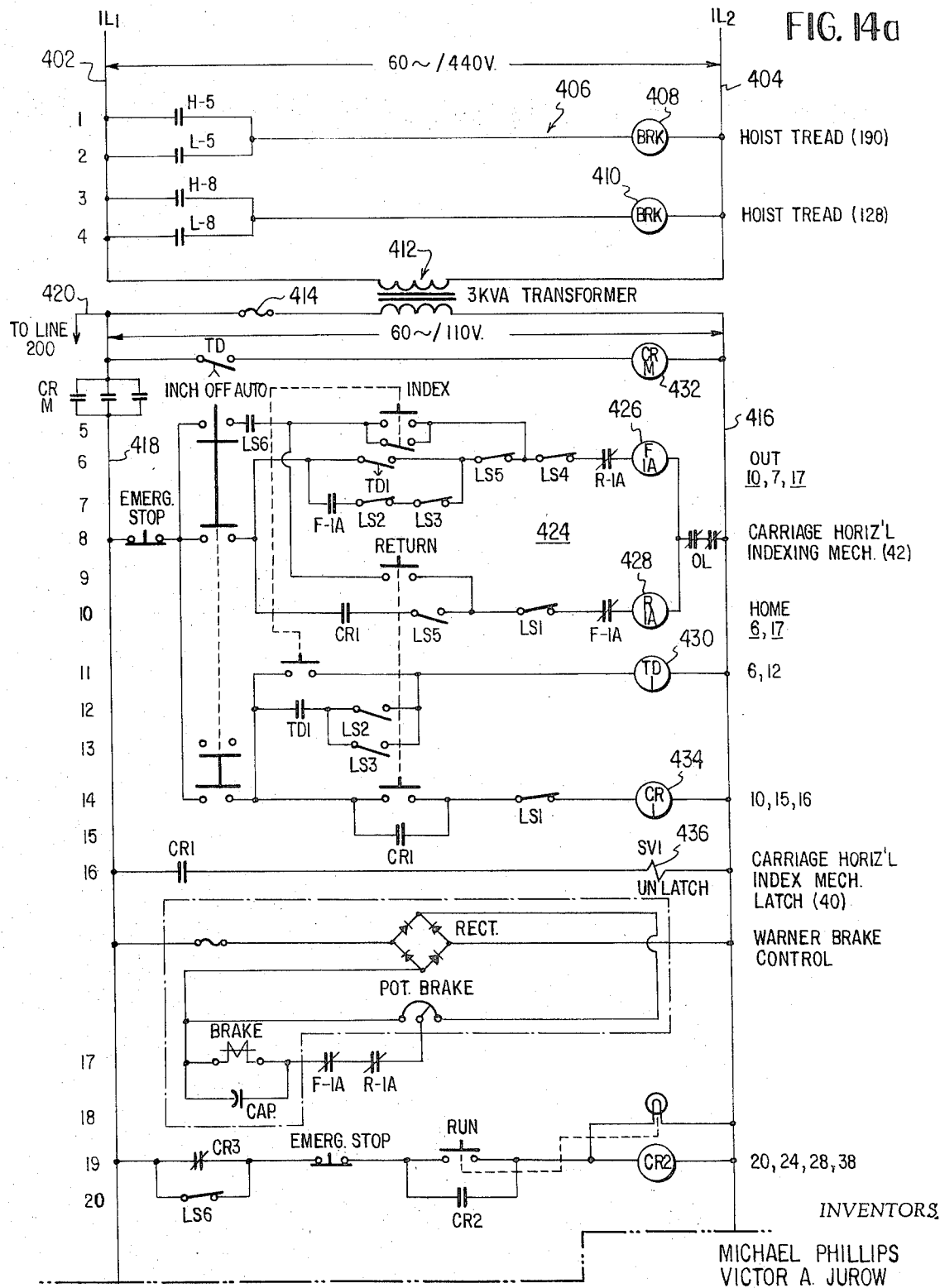

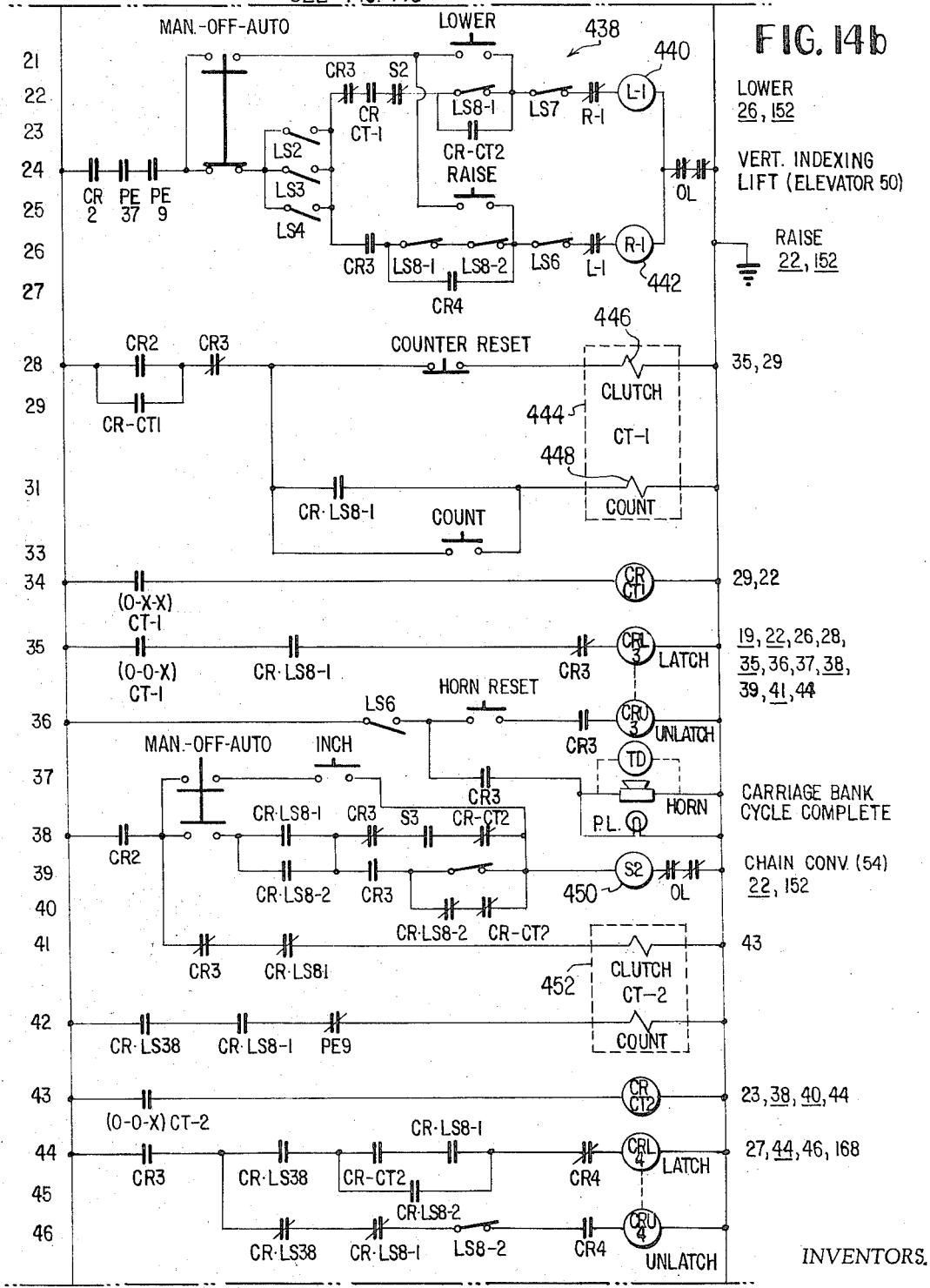

PATENTED DEC 18 1973

SEE FIG. 14h

| Line | Contact | Coil | References |
|---|---|---|---|
| 183 | LS21 | LS21 CR | 62,84,89,90 97,99,105 |
| 184 | LS22 | LS22 CR | 66,81,88,97,102 |
| 185 | PE28 | PE28 CR | 126,130 |
| 186 | LS29 | LS29 CR | 127,128,129,143 |
| 187 | PE31 | PE31 CR | 128,134,143 |
| 188 | LS32 | LS32 CR | 127,128,133,137 |
| 189 | LS34 | LS34 CR | 135,150,160,164 |
| 190 | LS35 | LS35 CR | 136,153,162,163 |
| 191 | PE36 | PE36 CR | 150,153,160,165 |
| 192 | PE15 | PE15 CR | 67,97,113,70 |
| 193 | LS20 | LS20 CR | 88,99,102 |
| 194 | LS23 | LS23 CR | 86,88,89 |
| 195 | LS38 | LS38 CR | 42,44,46 |
| 420 | | TD | |
| 200 | | PE9 | 416 / 24,42 |
| 201 | | PE10 | 48,57 |
| 202 | | PE10A | 51,56 |
| 203 | | PE11 | 422 / 56,67 |

SEE FIG. 14j

FIG. 14i

INVENTORS.
MICHAEL PHILLIPS
VICTOR A. JUROW

BY *LeBlanc and Shur*

ATTORNEYS.

SEE FIG. 14i

| Left | Label | Right |
|---|---|---|
| 204 | PE14 | 178 |
| 205 | PE14A | 78 |
| 206 | PE15 | 192, 70 |
| 207 | PE16A | 179 |
| 208 | PE16B | 180 |
| 209 | PE17 | 181 |
| 210 | PE24 | 114 |
| 211 | PE24A | 114 |
| 212 | PE25 | 116 |
| 213 | PE26 | 119 |
| 214 | PE27 | 122, 130 |
| 215 | PE28 | 139, 185 |
| 216 | PE31 | 139, 187 |
| 217 | PE36 | 158, 191 |
| 218 | PE36A | 165 |
| 219 | PE37 | 24, 147, 158 |
| 220 | PE39 | 147, 156 |
| 221 | PE41 | 92, 113 |

INVENTORS.
MICHAEL PHILLIPS
VICTOR A. JUROW

BY *Le Blanc and Shur*

ATTORNEYS.

MECHANIZED GUM BASE PAN UNLOADER

This invention relates to a machine for automatically unloading pans and is particularly adapted for unloading pans filled with chewing gum base and which, because of their size and weight, are relatively difficult to manually unload.

In the manufacture of chewing gum, it is conventional practice to first formulate a chewing gum base in bulk quantities to which is later added coloring, flavoring, sweeteners, and other materials. The chewing gum base may typically comprise one or more in various combinations of natural gums, resins, and waxes as principal components and frequently lesser amounts of other materials.

After mixing and processing, chewing gum base is conventionally poured into pans or open-topped trays where it is permitted to solidify and harden into a solid mass. The material, after solidification and hardening, is removed from the trays and packaged for shipment in bulk form for later processing into the conventional chewing gum sticks or tablets.

In a typical manufacturing process, the molten or viscous, semi-liquid chewing gum base is poured into the pans and these are in turn loaded onto a pan carriage. The carriage is manually propelled along an overhead rail to a suitable location where the carriage remains until the gum base material has hardened. Once the gum base has hardened, the carriages are manually unloaded, the gum base in solid block form manually removed from the pans for package and shipment, and the pans themselves are returned to the carriage for refilling and further use. Because of the tendency of the material to stick to the metal pans, the pans are customarily coated with a suitable release agent, such as calcium carbonate slurry. In spite of this, the pans are difficult to empty and this problem is aggrevated by the fact that a pan filled with gum base weighs in the neighborhood of about 100 pounds. Because of this substantial weight, manual handling of the loaded pans is difficult and separation of the hardened gum base from the pans is a difficult and burdensome task.

The present invention is directed to a machine for eliminating this burdensome task by automatically unloading the heavy pans filled with gum base. The machine of this invention (a) removes the fully loaded pans weighing approximately 100 pounds each from a cooling carriage having a total of 48 pans per carriage, (b) removes the gum base material from the pans, (c) coats the inside of the pans with a release agent, such as calcium carbonate slurry, and finally (d) reloads the carriage with empty pans so that the carriage is ready for refilling.

The pan unloader comprises a vertically indexable elevator which moves downwardly into and upwardly out of a pit or well provided in the factory floor. The carriage filled with loaded pans is manually propelled along an overhead rail into the elevator where it is locked to an indexing mechanism for horizontally indexing the carriage into the proper position within the elevator. The individual pans are supported by their upper edges on rails in the skeleton-type carriage and located within the pit is a pan removal chain conveyor. As the carriage descends with the elevator into the pit, the underside of successive pans are engaged and lifted by the chain conveyor and propelled out of the carriage onto an external conveyor belt mounted on the factory floor. The fully loaded pans are propelled along the external conveyor belt into an unloading roll-over in which the pans are inverted, i.e., rotated 180°, so that the bottomside of the pan is up.

From the roll-over, the pans pass to a further conveyor belt mounted on the vertically movable platform of an unloading lift. The inverted pans resting on the lift platform are first engaged by a plurality of vibratory hooks which lift the inverted pans approximately 8 inches off the lift belt and vibrate the pans causing the hardened gum base material to disengage from the pans and fall by gravity onto the lift belt. The gum base blocks now discharged from the pans are propelled by the conveyor belt on the lift platform to a discharge conveyor where the approximately 80 pound gum base blocks are stacked and wrapped for shipment.

Once the gum blocks have been removed from the pans, the inverted pans are returned to the now stationary belt on the lift platform and the lift is actuated, causing the platform and belt to be raised to the upper level of the unloader.

When the lift has reached the upper level, the lift belt is reactivated but in the opposite direction so that the inverted pans are discharged from the lift platform onto upper level belt conveyors. The inverted pans are passed along the upper level over the pit and carriage and through a coater where the now-empty inverted pans have their under or inside surface coated with calcium carbonate slurry. The coated pans are discharged at the upper level onto a belt conveyor mounted on the vertically movable platform of a loading lift which lowers the inverted pans down to the first level of the machine but on the opposite side of the carriage from which they were discharged. From the loading lift, the pans pass through a loading roll-over which re-inverts the now-empty pans to the upright position. From the loading roll-over, the pans are propelled back into the carriage where they come to rest on the carriage rails ready for reuse. The sequence is such that during downward movement of the carriage, successive tiers of pans are removed and during the return upward movement of the carriage, empty pans are reloaded into the carriage, the first pan removed having been emptied and returned for reloading by the time the last full pan has been removed.

Important features of the invention include the fact that the pans are not only removed from the carriage and unloaded in an automatic manner, i.e., separated from the gum base, but the pans are also automatically returned and reloaded into the carriage by the machine of this invention. Other important features include the provision of a novel electrical control circuit for sequencing pans through the machine and a pneumatic control system for controlling the operation of various machine components. The gum base is discharged in the form of solidified blocks from the pans, each individual block having a weight of approximately eighty pounds. These are discharged from the machine onto a scissors lift where they are stacked and wrapped for shipment to the chewing gum manufacturer who forms conventional chewing gum sticks or tablets from the gum base through the addition of coloring, flavoring, sweeteners, and the like.

It is therefore one object of the present invention to provide a mechanized gum base pan unloader.

Another object of the present invention is to provide a machine for automatically removing solidified material from open-topped containers or pans.

Another object of the present invention is to provide a carriage unloader which performs the steps of removing pans from the carriage, separating the pans from their contents, and reloading the empty pans back onto the carriage, all in an automatic and controlled manner.

Another object of the present invention is to provide an improved method of unloading gum base material from gum base cooling pans.

Another object of the present invention is to provide a mechanized system for separating material, such as gum base, from pans to which the material has a tendency to stick or adhere.

Another object of the present invention is to provide a mechanized unloading system in which the empty pans after unloading are coated with a release agent prior to reloading in a pan carriage.

Another object of the present invention is to provide a pan unloading system in which a carriage in which the pans are supported is indexed relative to a conveyor whereby the conveyor acts to automatically remove the pans from the carriage as the carriage is indexed to its next position.

Another object of the present invention is directed to a pan carriage unloader in which the carriage moves vertically into and out of a well or pit in the factory floor during pan unloading and reloading.

Another object of the present invention is to provide a pan unloading system in which a carriage is indexed horizontally relative to the remainder of the system so that successive banks of pans are removed and then reloaded into the carriage.

Another object of the present invention is to provide an improved electrical control system for an automatic pan unloader.

Another object of the present invention is to provide an improved pneumatic system for an automatic pan unloading machine.

These and further objects and advantages of the invention will be more apparent upon reference to the following specification, claims, and appended drawings, wherein:

FIG. 3 is a front elevation with parts in section of the mechanized gum base pan unloader of FIG. 1;

FIG. 5 is a side elevation of the unloading lift of FIG. 4;

FIG. 6 is a front elevation with parts in section of the unloading roll-over forming a part of the unloading machine of FIG. 1;

FIG. 7 is a side elevation with parts in section of the roll-over of FIG. 6;

FIG. 8 is a diagrammatic view of the pan unloader of FIG. 1 illustrating control points in the unloading sequence;

FIGS. 14a–14j, taken together as FIG. 14, is a line diagram of the electrical circuit for the pan unloader.

Figure 1:
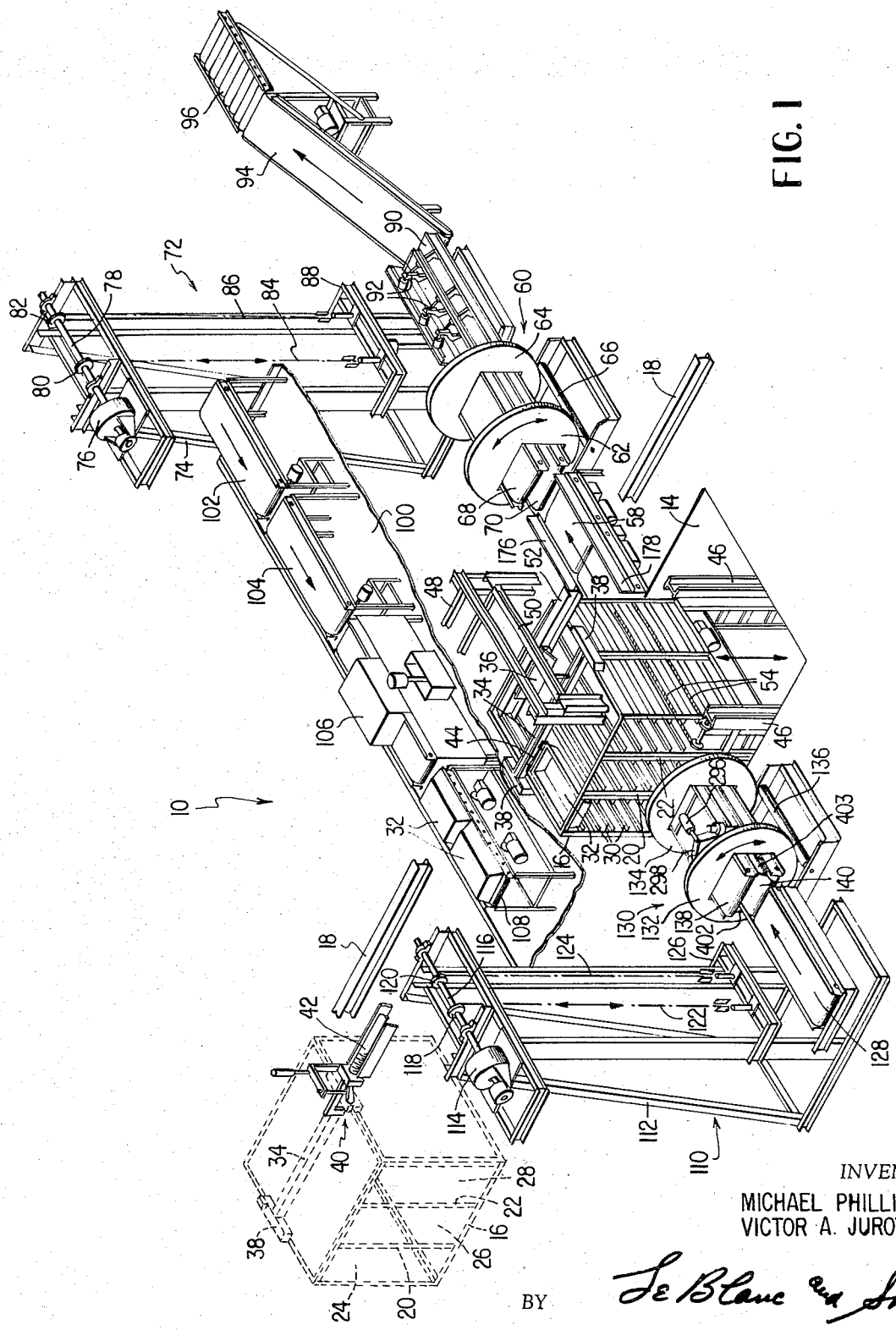
FIG. 1 is a perspective view of a mechanized gum base pan unloader constructed in accordance with the present invention.
Figure 2:
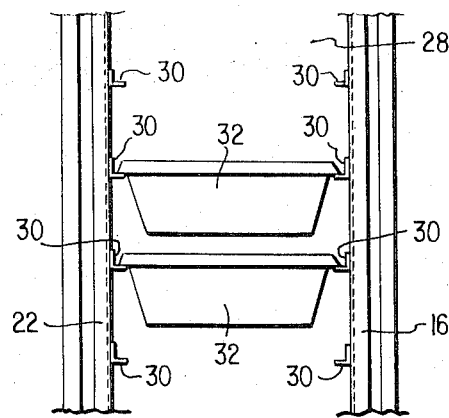
FIG. 2 is a view of a portion of the pan carriage of FIG. 1 showing the manner in which pans are supported in the carriage.

Referring to the drawings, the novel mechanized gum base pan unloader of the present invention is generally illustrated at 10 in FIG. 1. The unit is shown mounted on a factor floor 12, which is provided with a well or pit 14 adapted to receive an open-framed pan carriage 16. Carriage 16 is movable along an overhead rail 18 from the dashed line position illustrated in FIG. 1 to the solid line position illustrated immediately above pit 14. Carriage 16 is formed from a metal framework open on top and bottom and all sides, but is divided by two pairs of uprights 20 and 22 into three vertically extending sections 24, 26, and 28. A portion of the front section of the carriage 16 is illustrated in FIG. 2. Each section is provided with a plurality of vertically spaced, horizontal rails 30 on each side upon which rest the metal gum base cooling pans 22 supported by outwardly extending flanges along opposite upper edges. In the preferred embodiment, the carriage is provided with eight pairs of rails 30 in each section, such that two cooling pans 32 are supported on each rail pair, there being 2 × 8 or 16 pans in each carriage section or a total of 48 cooling pans supported in each carriage 16. In this embodiment, the cooling pans 32 are made of stainless steel having a width of 19 inches, a length of 33 inches, and a depth of 6 inches. The pans each weigh 20 pounds when empty and 100 pounds when filled with chewing gum base. Thus, each carriage, when loaded, weighs in the neighborhood of 5,000 pounds.

Carriage 16 is provided at its top with a central reinforcing channel member 34, which is attached to a trolley 36 having rollers which engage and roll along the lower flange of the I-beam rail 18. Each end of reinforcing channel 34 is bolted to a heavy wooden block or bumper 38, which has a vertically extending portion adapted to be engaged by a latch mechanism, generally indicated at 40. The latch mechanism is threaded to an indexing screw 42 which is rotated to advance or index carriage 16 in the direction of the arrow 44 over pit 14.

Extending upwardly from the bottom of pit 14 are four heavy I-beam columns 46 which terminate at their upper ends in a fixed frame 48. Frame 48, with its attached columns 46, supports a movable frame or elevator 50 which carries a short section of I-beam 52 which, when the elevator is in its uppermost position, is in alignment with and forms an extension of the I-beam rail 18. Elevator 50 carries latch 40 and screw 42 along with an electrical motor (not shown) for rotating the screw. These elements are mounted on the elevator above the carriage and the screw 42 extends parallel to rail section 52. Also mounted above pit 14 on a pedestal in the pit is a discharge conveyor 54 adapted to engage the undersides of the successive banks of pans to remove them from the carriage 16.

Positioned adjacent pit 14 on the factory floor 12 are a pair of conveyor belts 56 and 58 which feed pans from the carriage into a discharge roll-over, generally indicated at 60. This roll-over comprises a pair of heavy steel tires 62 and 64, which rotate on a pair of rollers, such as the roller 66, and carry with them a pair of spaced conveyor belts 68 and 70. The purpose of roll-over 60 is to invert the pans, i.e., rotate them 180°, with the bottom side up so that the gum base block may be discharged from the pan. Discharge of the gum base block is effected by a discharge lift, generally indicated at 72 in FIG. 1. Lift 72 comprises a framework 74 on which is mounted an electrical drive motor 76 and shaft 78, which shaft carries a pair of sprockets at 80 and 82. Roller chains pass over these sprockets and the roller chains 84 and 86 are attached at their lower ends to a lift elevator 88. Attached to the lift elevator is a conveyor belt 90 and a plurality of pneumatically operated hooks or grabbers 92 positioned immediately above conveyor belt 90. The pans are engaged by hooks 92 and lifted away from the gum base block which is then propelled by conveyor belt 90 onto inclined belt 94 to rollers 96, where the blocks are stacked and wrapped for shipment on a suitable scissors lift, generally indicated at 98.

A second level of the factory floor is indicated at 100 and this level is provided with a pair of conveyor belts 102 and 104 which feed a coating machine 106 which coats the insides of the now-empty pans with a calcium carbonate slurry. Two of the inverted coated pans 32 are illustrated in FIG. 1 as located on a roller-type conveyor 108 ready to be placed on the elevator of a feed lift, generally indicated at 110. Lift 110, except for the grabbers 92, is identical to discharge lift 72, previously described, and comprises a framework 112 at the top of which is mounted a drive motor 114 and shaft 116 with sprockets 118 and 120 over which pass roller chains 122 and 124. These roller chains are secured at their lower ends to lift elevator 126 which comprises a framework on which is supported a feed conveyor belt 128. This belt discharges into a feed roll-over 130, similar to the discharge roll-over 60. Roll-over 130 again includes the steel tires 132 and 134 which rotate on a pair of rollers, one of which is illustrated at 136, and which carry a pair of spaced conveyor belts 138 and 140. Roll-over 130 is provided to reinvert the pans so that they may be reloaded in the empty condition back into the same carriage from which they came. The pans are discharged from roll-over 130 onto conveyor 54 which properly positions the pans over the rails 30 in the carriage.

FIG. 3 is a front elevation of the pan unloader 10 with parts in section and parts omitted for the sake of clarity. Stationary frame 48 extends downwardly into the pit 14 and the movable frame or elevator 50 slides along the four corner I-beams of the frame 48 and is separated from it by guide rollers between the frames. At the bottom of the pit is an electric drive motor 142 which is connected to a pair of gear reduction boxes, such as the box 144, by a drive belt 146. Gear box 144 acts through a pair of flexible couplings 148 and 150 to rotate shafts 152 and 154 on which are mounted cable drums 156 and 158. Wrapped over these drums are respective cables 160 and 162 which pass over suitable rollers on stationary frame 48 and are secured to the respective lower edges of elevator 50. In the preferred embodiment, there are four drums and four elevator cables, one connected to each corner. A central shaft connects the two gear boxes and motor belt 146 drives this shaft. Rotation of the cable drums 156 and 158 causes the elevator to be lowered and raised into and out of the pit 14 by the cables 160 and 162. Wooden bumper 38 of the carriage 16 is provided with an upward projection or key 164 which is engaged by the latch 40 and rotation of screw 42 indexes the carriage along I-beam track 52. This track is bolted or otherwise suitably secured to a central reinforcing beam 166 forming a part of the elevator or movable frame 50. It is understood that the carriage 16 is suspended from track 52 by the trolley 36 of FIG. 1.

The bottom of the pit 14 also supports a narrow elongated four-cornered pedestal including uprights 168 and 170. This pedestal is narrower than each of the three carriage sections 24, 26, and 28, of FIG. 1, so that the carriage may be lowered into the pit and at the same time clears the pedestal, generally indicated at 172, which pedestal telescopes into one of the sections 24, 26, or 28, depending upon the position of the carriage along track 52. Pedestal 172 has at its upper end the chain conveyor 54 which is belt-driven from a suitable electric motor, generally indicated at 174, carried by the pedestal.

Conveyor belts 56 and 58 are provided with a common pair of side rails 176 and 178 and these conveyor belts are driven from suitable motors located beneath them, as generally indicated at 180 and 182. The remaining drive belts are similarly operated and their drive mechanisms are believed adequately illustrated in FIG. 3 so that a detailed description of the drive for each conveyor belt is believed unnecessary. Roll-over 60 in FIG. 3 is supported in a recess 184 in the factory floor and the roll-over is similarly provided with a pair of side rails between the belts 68 and 70, one of the side rails being illustrated at 186 in FIG. 3. Lift elevator 88 carries with it a conveyor belt 190 which discharges empty pans by way of a plurality of bridge rollers 192 onto the inclined conveyor belt 94. This belt is driven by a suitable motor as indicated at 194. While lift roller chains 84 and 86 may be connected directly to the lift elevator 88, they are preferably connected to the elevator 88 and through the respective shock absorbers 196 and 198. The opposite ends of the roller chains 84 and 86 pass over the sprockets 80 and 82 and are connected to a counterweight box 200 which goes down on the other side of the lift when the lift elevator 88 is raised.

Coating unit 106 is a spray device which directs a spray upwardly into the inverted inside of the empty pans to coat them with a calcium carbonate slurry. From the coater, the pans exit onto roller conveyor 108 which is formed with spaced rollers, such as those illustrated at 202, so that excess slurry may drip from the pans through the rollers into an inclined tray or drip pan 204. From this pan, the excess slurry runs down into a suitable sump in the coater 106, where it is recycled. A pneumatically operated stop 206 is provided at the end of roller conveyor 108 to insure that the pans are not discharged from this roller before the loading lift elevator 126 is raised and ready to receive them. This stop is automatically retracted by actuation of an air cylinder 208 in a manner more fully described below. Lift 110 is similarly provided with a counterweight 210 and the opposite ends of the lift roller chains 122 and 124 are again preferably connected to the lift elevator 126 by shock absorbers 212 and 214. Roll-over 130 is provided with a pair of side rails, one of which is illustrated at 216, and this roll-over is similarly recessed into the factory floor as indicated at 218 in FIG. 3.

Figure 4:
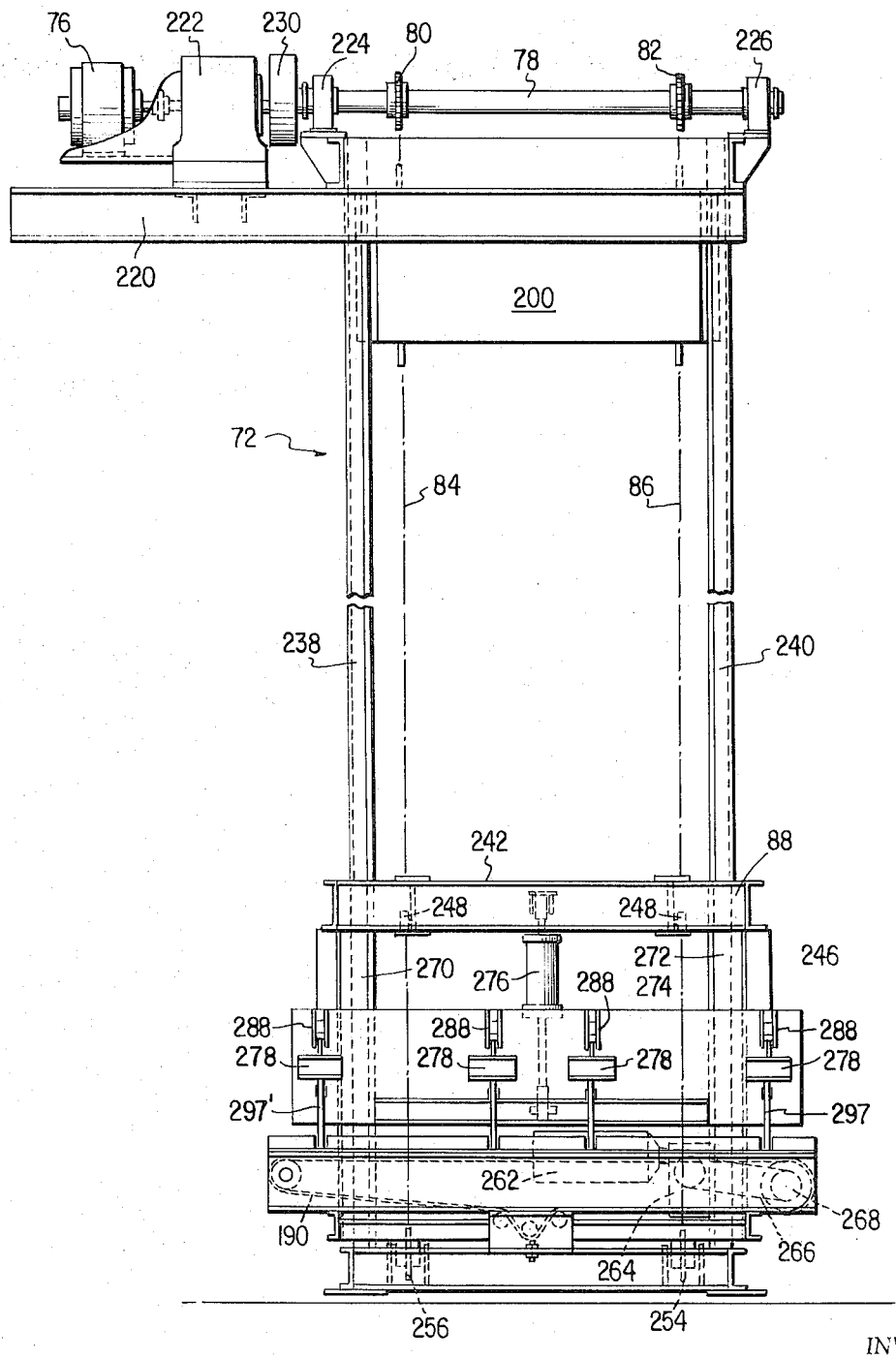
FIG. 4 is a front elevation of the unloading lift forming a part of the pan unloader of FIG. 1.

FIG. 4 is a front elevation of the discharge lift 72 and FIG. 5 is a side elevation of the lift. It is understood that the loading lift 110 is of similar construction except that it omits the grabbers for separating the pans from the chewing gum base blocks. In the preferred construction, the lift comprises an upper platform 220 on which is mounted the electrical drive motor 76, a gear box 222, a pair of bearings 224 and 226, and the drive shaft 78 on which are mounted the drive pulleys 80 and 82. As best seen in FIG. 5, upper platform 220 also preferably supports a pair of idler pulleys, one of which is illustrated at 228, over which the respective belts 84 and 86 pass. The shaft is driven from the gear box 222 through a drive sprocket 230. Conveyor belt 190 is adapted to be raised and lowered by the lift between the solid line position illustrated in FIG. 5 and the dashed line position illustrated in that FIGURE where the presence of pans or trays on the belt are sensed by the interruption of a light beam by the pan from a photosource 232 to a photodetector 234, both depending from upper platform 220.

Upper platform 220 is connected to a lower platform or base 236 by a pair of spaced I-beam uprights 238 and 240 which act as tracks for the lift elevator 88. Platform 88 comprises upper and lower frames 242 and 244 rigidly joined by vertical channels 246. Upper elevator frame 242 is provided with guide rollers 248 engaging the flanges of respective standards 238 and 240 and lower frame 244 is provided with similar guide rollers 250, similarly engaging the flanges of the standards. Upper elevator frame 242 is provided with a pair of chain guides, one of which is illustrated at 252 in FIG. 5, which pass the respective belts 84 and 86. These belts are preferably in the form of riveted-type roller chains and pass over idler sprockets 254 and 256 secured to the lift base 236. This base also supports a photosource 258 and photodetector 260 for sensing the presence of a pan 32 on conveyor belt 190 at its lowermost position. Lower elevator frame 242 supports a conveyor belt drive motor 262 and gear box 264 which is connected by a drive belt 266 (FIG. 4) to the drive sprocket 268 for conveyor belt 190.

Depending from the upper elevator frame 242 are a pair of vertical channels 270 and 272 and slidable vertically along these is an elevator subframe 274. The subframe 274 is connected to upper elevator frame 242 by a short stroke (8 inch stroke) air cylinder 276. Extending horizontally from the subframe are four substantially U-shaped supports 278 and each of these pivotally mounts inner and outer hooks 280 and 282. Outer hook 282 is pivoted to support 278 at 284 and inner hook 280 is pivoted to the support at 286. Four one and one-half inch air cylinders 288 are pivoted at one end 290 to subframe 274 and at the other end 292 (FIG. 5) to a crank 294. Crank 294 is connected at its other end to the pivot shaft of hook 280 so that rotation of crank 294 in a counterclockwise direction about pivot 286 causes hook 280 to also rotate in a counterclockwise direction from the position illustrated about pivot 286. Crank 294 is attached by a connecting rod 296 (pivoted at both ends) to hook 282 so that outward movement of hook 280 away from pan 32 is accompanied by outward movement of hook 282, also away from the opposite side of pan 32. Contraction of cylinder 288 causes opposite or clockwise rotation of crank 294 about pivot 286 and corresponding closure of the hooks 280 and 282 on the pan 32. The side rails of conveyor belt 190 are suitably apertured to pass the four pairs of hooks and these hooks are suitably beveled or tapered at their ends so as to ride under and engage the undersides of the pan flanges. When a pan is engaged by the hooks (normally two pans are on the belt so that two pairs of hooks engage each pan), retraction of cylinder 276 raises subframe 274 and lifts the pans approximately 8 inches off the top surface of belt 190. In addition, the pans are vibrated by vibrators 297 and 297' mounted on the two outermost hooks 280 in this elevated position to make sure that the pans disengage from the gum base block which remains on or falls down onto the top of the conveyor belt 190. With the pans in the elevated position, conveyor belt 190 is activated to discharge the gum base blocks. After the blocks have been discharged, the conveyor belt 190 is stopped, the pans are returned to the belt, and then the entire elevator, including conveyor belt 190, is raised to the second floor level of the factory.

FIG. 6 is a front elevation of the discharge or filled pan roll-over 60 with parts broken away and parts in section. It is understood that the feed roll-over or empty pan roll-over 130 is of similar construction. FIG. 7 is a side elevation of the roll-over 60 of FIG. 6. The roll-over essentially comprises a pair of conveyor belts which are spaced apart and mounted on a rotatable cylinder or drum 298. Carried by the rotatable drum 298 are the steel tires 62 and 64 which are rotatably mounted on rollers 66 and 66' (FIG. 7) rotatably supported in the roll-over base 300 mounted in recess 184 in the factory floor 12. Mounted on drum 298 is a conveyor belt drive motor 302 which, by way of example only, may be a ¾ horsepower, 3 phase, 60 cycle, 230/460 volt, totally enclosed right-angle gear motor with Class III gearing. This motor is coupled through a reduction gear box 304 to a drive chain 306 which rotates the drive sprocket 308 for conveyor belt 70. Drive sprocket 308 is in turn connected by drive belt 310 to the drive sprocket 312 for conveyor belt 68. Drive belts 68 and 70 are mounted in frames 314 and 316 secured to drum 298 and these frames carry light sources 318 and 320 and corresponding photodetectors 322 and 324. Projecting horizontally from steel tire 62 is a semicircular flange or rim 325 around which is wrapped a drive chain 326 which rotates the drum 298 and the conveyor belts 68 and 70 carried by it. Referring to FIG. 7, the chain 326 is driven from an electrical drive motor 328 through drive sprocket 330, the motor being mounted on the roll-over base 300. Motor 328, by way of example only, may be a 1 horsepower, 3 phase, 60 cycle, 230/460 volt totally enclosed parallel gear motor Class III gearing. Chain 326 is a 20 foot long riveted type of roller chain. Rim 325, around which the chain is wrapped, terminates at one end in a laterally extending post 332 and at its other end in a similar post 334. One end of the chain 326 is secured to the post 332 and the other end of the chain is secured to the other post 334. The chain may be traced in FIG. 7 from one end at post 332 around a major portion of rim 325 over an idler sprocket 336 in base 330, over a second sprocket 338 and around drive sprocket 330. From drive sprocket 330, the chain passes over an additional idler sprocket 340 and over a small portion of rim 325 where its other end is secured to the post 334. Motor 328 when energized causes the drum and tires to rotate from one extreme position, as illustrated in FIG. 7, 180° in the clockwise direction, as indicated by arrow 342. Tire 64 is provided with a pair of stops 344 and 346 so that rotation of the roll-over in the clockwise direction is limited by engagement of stop 344 with roller 66 and rotation of the roll-over in the clockwise direction 180° from the position illustrated is limited by engagement of stop 346 with roller 66'. In operation, the conveyor belts are actuated and two pans are drawn into the roll-over by the lower conveyor belt 70. The belts are then stopped and motor 228 energized, causing the roll-over to rotate 180°, inverting the pans so that they rest on the other conveyor belt 68. The adjacent surfaces of the belt are preferably spaced 6 ½ inches so that the 6 inch deep pans, when resting on one belt, just clear the other belt. After the roll-over has been rotated, conveyor belt drive motor 302 is reversed and belt 68 acts to discharge the pans from the roll-over. The conveyor belts are, of course, stopped during the time that the roll-over is being rotated. FIG. 7 illustrates additional light sources 348 and 350 and limit switches 352 and 354 for control purposes more fully described below.

Figure 9:
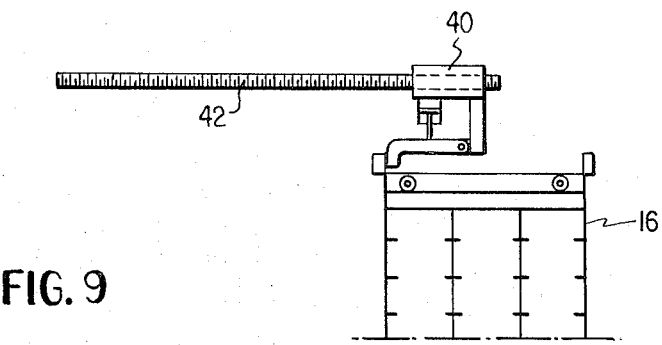
FIG. 9 is a view showing the carriage indexing mechanism and carriage latch forming a part of the unloader of FIG. 1.
Figure 10:
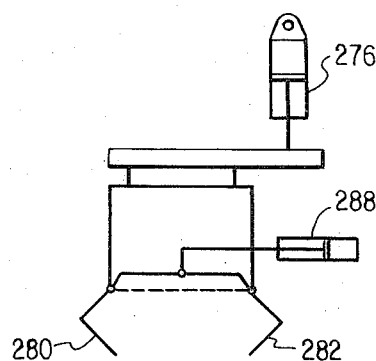
FIG. 10 is a diagrammatic view of the unloader lift pickup and vibrator arms used to separate the gum base from the pans.

FIG. 8 is a schematic diagram of the unloader 10 showing various control points in the system. FIG. 9 is a schematic diagram of the latch indexing mechanism, and FIG. 10 shows the control points for the grabbers or pick-up arms on the vertical discharge lift elevator. As has been pointed out, the automatic pan unloading machine 10 (a) removes fully loaded pans weighing 100 pounds from a cooling carriage in which there are a total of 48 pans per carriage, (b) removes the gum base material from the pans, (c) coats the pans on the inside with a release agent or calcium carbonate slurry, and (d) reloads the carriage with the empty pans so that they are ready for refilling.

A more detailed description of the mode of operation may be summarized as follows:

1. A fully loaded carriage 16 is manually pushed along the overhead monorail and latched to the indexing mechanism by latch 40, which indexes the carriage to a position in the elevator 50 where the carriage is supported from the elevator rail 52.

2. The indexing unit positions the carriage so that the first tier of pans are directly over the pan removal chain conveyor 54.

3. The chain conveyor belt 54 removes two side-by-side pans in the carriage and places the two pans on respective conveyor belts 56 and 58. Throughout the operation, limit switches and photoelectric eyes, labeled PE in FIG. 8, locate and indicate correct pan position in each unit. In the event the pans are out of location or do not clear each element, the machine immediately ceases function.

4. Conveyor belts 56 and 58 move the two pans into the roll-over 60.

5. Roll-over unit 60 inverts the pans so that they are upside down.

6. Roll-over 60 then moves the two upside down pans onto the lift conveyor belt 190.

7. The pick-up arms or hooks 280 and 282 (two pair per pan) grab the pans and raise them 8 inches above conveyor belt 190 and the pans are vibrated to immediately unload them so that the material is either immediately released or drops back onto the conveyor belt 190. This coneyor belt moves the blocks of gum base material to the inclined conveyor 94. The lift them immediately moves the two pans vertically to the upper level of the factory floor.

8. The two pans arrive at the upper level empty and turned upside down. Conveyor 190 is now actuated to run in the reverse direction and the pans move onto first conveyor belt 102 and them conveyor belt 104.

9. Conveyor belt 104 then moves the two pans into the slurry coater 106.

10. In the coater, the insides of the pans are completely coated with a powder slurry of calcium carbonate and from the coater the pans are propelled over onto the roller conveyors 108. Excess slurry drips through the roller conveyors 108 and is returned to the coater 106.

11. The rollers of roller conveyor 108 move the two pans onto the lift conveyor belt 128 in the upside down position.

12. Conveyor belt 128 on the lift elevator lowers the two pans to the lower level and is energized to run in the opposite direction causing the two pans to move into the return or feed roll-over 130.

13. Roll-over 130 rotates the pans 180° and holds this position with the pans until the carriage 16 has indexed downward seven counts and has removed seven pairs of pans, i.e., has removed all pans except the last two of that bank.

14. When seven counts are sensed, the last two fully loaded pans are moved onto conveyor belts 56 and 58 by chain conveyor 54 and the empty pans from the roll-over 130 are simultaneously loaded into the carriage.

15. The procedure now reverses itself and the carriage indexes upwardly seven counts or through seven positions in predetermined steps to receive the coated empty pans.

16. When all sixteen pans of the first bank are completely unloaded and reloaded, the indexing screw 42 is rotated and indexes the carriage 24 inches so that the next bank or tier of pans is positioned over the chain conveyor 54 for removal and installation as per the first bank in the manner described immediately above.

17. When all three banks or tiers of pans have been unloaded and reloaded, latch mechanism 40 releases the carriage.

18. The carriage is manually moved from the elevator rail section 52 onto the overhead rail 18 on the exit side of the machine and a full carriage is manually engaged on the incoming side of the machine for repeat of the complete cycle. The machine is capable of unloading, emptying and reloading pans at the rate of three carriages per hour.

Figure 11:
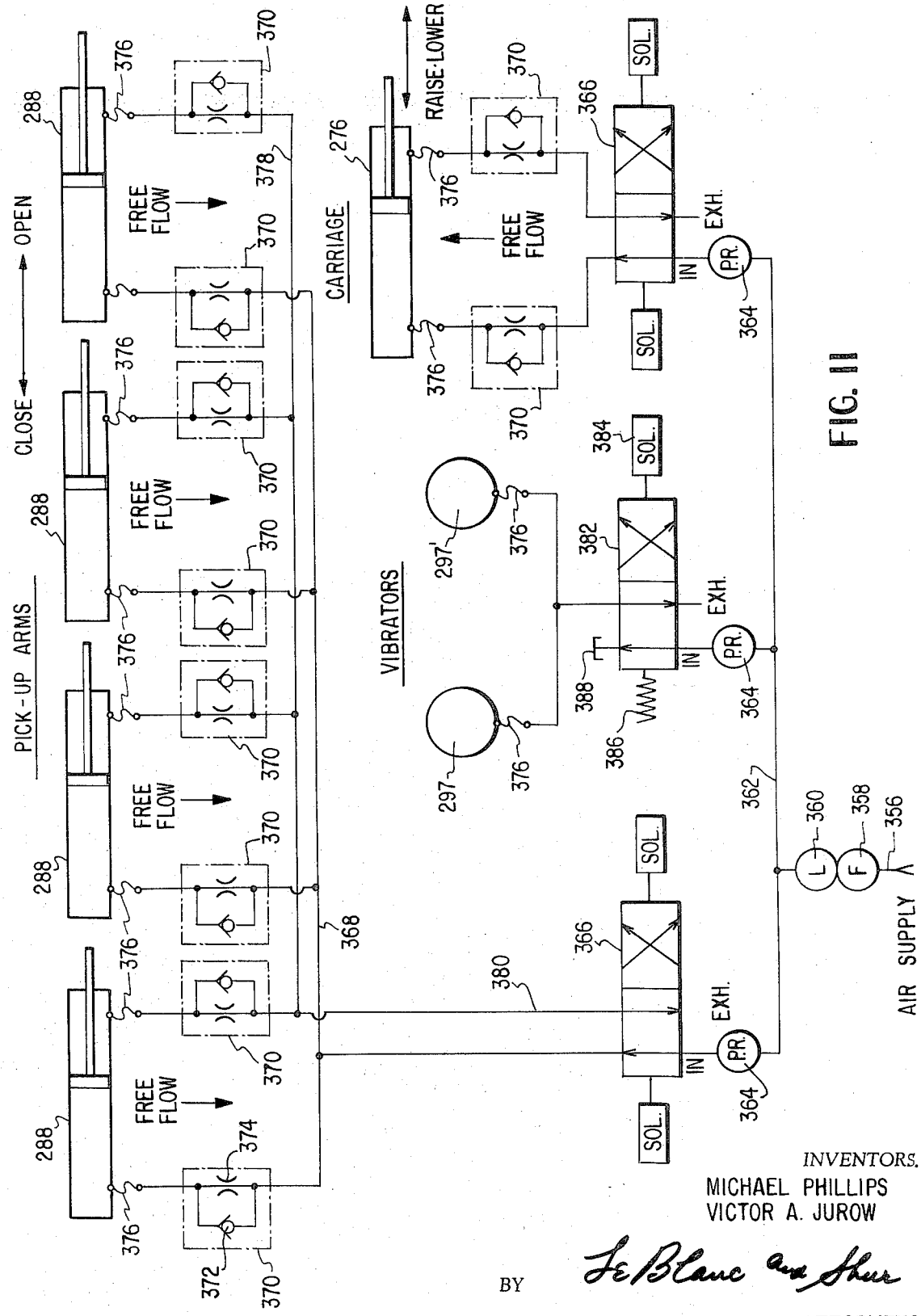
FIG. 11 is a diagrammatic view of a portion of the pneumatic circuit forming a part of the pan unloader of FIG. 1.
Figure 12:
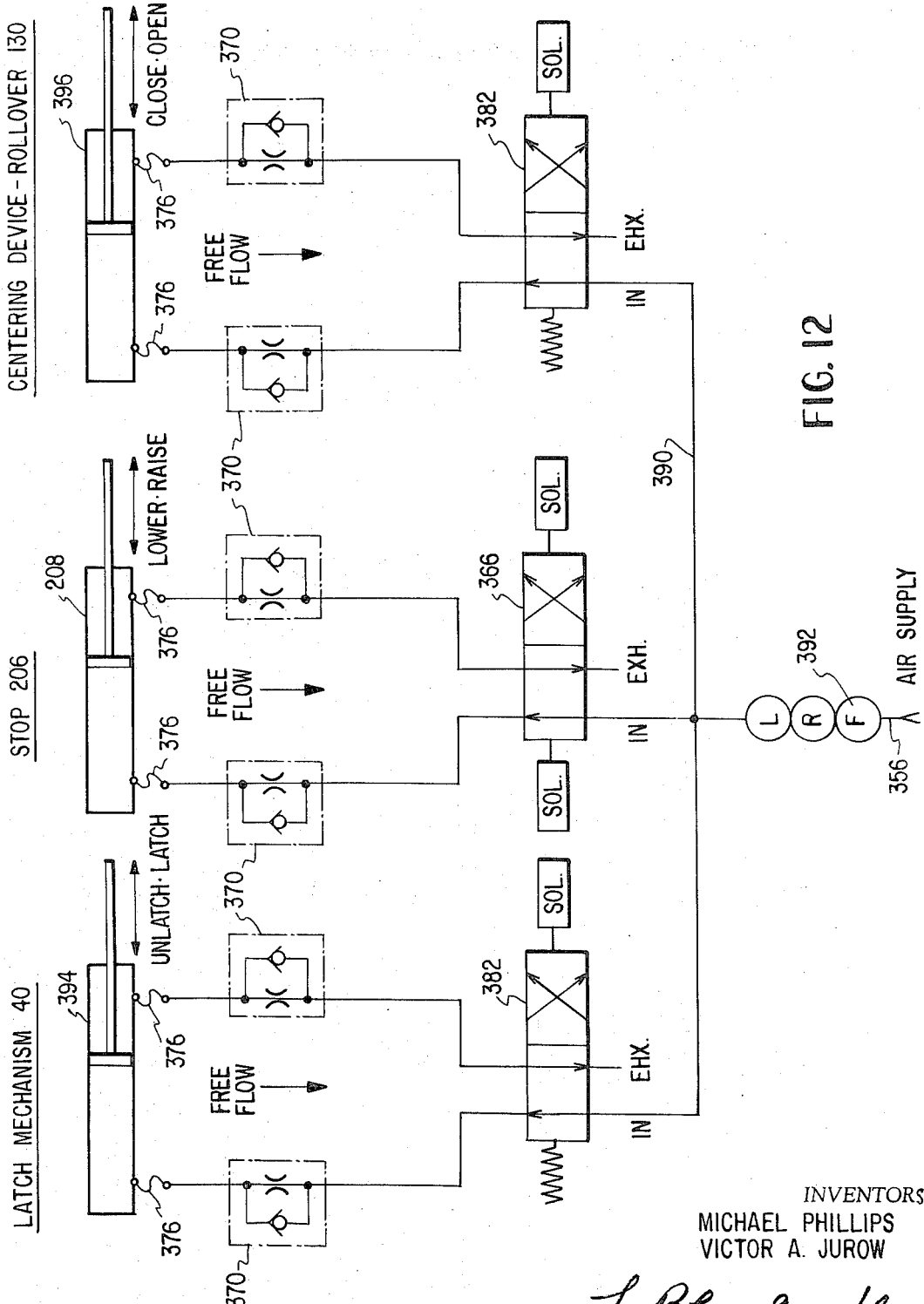
FIG. 12 is a diagrammatic view of another portion of the pneumatic control circuit of the unloader of FIG. 1.

FIG. 11 shows a portion of the pneumatic or air supply circuit for the pan unloader 10 and FIG. 12 is a diagram illustrating the remainder of the pneumatic system. A suitable source of air under pressure (not shown) is connected to a ⅜ inch supply line 356 in FIG. 11 and passes through a filter 358 and lubricator 360. By way of example only, filter 358 may be a Bellows-Valvair filter and lubricator 360 is a Bellows lubricator unit. Air under pressure passes through a distribution line 362 to a pressure regulator 364 and tthrough a solenoid valve 366 to a ¼ inch manifold line 368. Regulator 364 is preferably a Bellows-Valvair pressure regulator with gage and the solenoid valve 366 may be a Hanna 4-way double solenoid air valve with 60 cycle, 115 volt coils. Manifold 368 connects to the 4 cylinders 288 actuating the four pairs of grabber hooks or pick-up arms on the discharge lift elevator as illustrated in FIGS. 4 and 5. The cylinders are connected to line 368 through speed control units 370, each comprising a check valve 372 and an adjustable constriction 374. This connection is through a section of flexible air line indicated at 376. The other sides of the cylinders 288 are similarly connected through flexible lines 376 and speed control units 370 to a manifold line 378 which leads to an exhaust port 379 through solenoid valve 366 by way of common line 380. The air supply, which may typically have a pressure of approximately 90 psig, is similarly connected through a pressure regulator 364 and a single solenoid valve 382 to the vibrators 297 and 297'. These vibrators are preferably of the free ball type and are connected through flexible sections of pneumatic line 376. Valve 382 includes a single solenoid 384 and a return spring 386 and the valve port 388 is closed off or plugged. By way of example only, this valve may be a Hanna 4-way, single solenoid air valve with a 60 cycle, 115 volt coil. The air supply is also connected to air cylinder 276 used to raise and lower the carriage or subframe of the lift elevator on which the pickup arms are mounted. This connection is through a pressure regulator 364, a double solenoid valve 366, speed control units 370, and flexible lines 376. Whereas the connections to the cylinders 288 and vibrators 297 and 297' are preferably through a ¼ inch line, the connection to air cylinder 276 for the carriage is preferably through a ⅜ inch line.

FIG. 12 shows the remaining portions of the pneumatic circuit and like parts bear like reference numerals. In this portion of the circuit, the air supply line 356 at a pressure of 90 psig is connected to a ¼ inch feed line 390 through a combination filter-regulator-lubricator unit 392, which, by way of example only, may be a Bellows-Valvair filter, regulator, and lubricator gage, Model No. B911-301. A single solenoid valve 382 and a pair of speed control units 370 connect this line to an air cylinder 394 which controls the operation of the latch mechanism 40 of FIG. 1. The line is also connected through a double solenoid valve 366 to the air cylinder 208 used to actuate the stop 206 for the roller conveyor 108 of FIGS. 1 and 3. Finally, the air supply line 356 in FIG. 12 is connected to an optional centering device including an air cylinder 396 mounted on the return or empty-pan roll-over 130 of FIG. 1. This air cylinder acts through a pair of levers 398 and 400 in FIG. 1 to move the side plates 402 and 403 of the roll-over toward and away from each other. When the roll-over 130 is filled with empty pans awaiting reloading into the carriage, air cylinder 396 is momentarily actuated and its piston retracted so that the side plates move inwardly bringing the two pans in the roll-over in proper alignment for feeding into the carriage 16.

Figure 13:
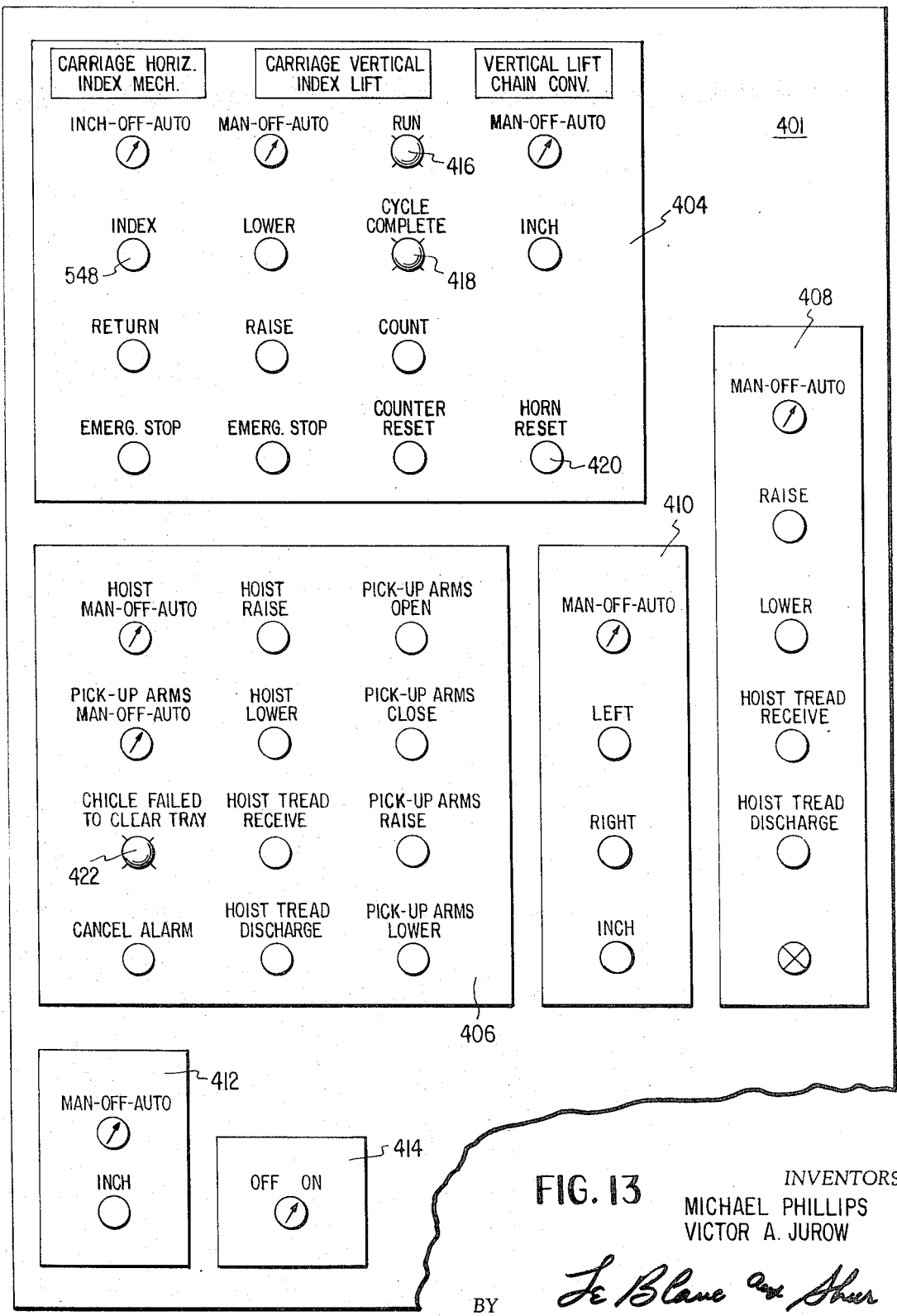
FIG. 13 illustrates sections of the control panel for the automatic pan unloader of FIG. 1.
Figure 14C:
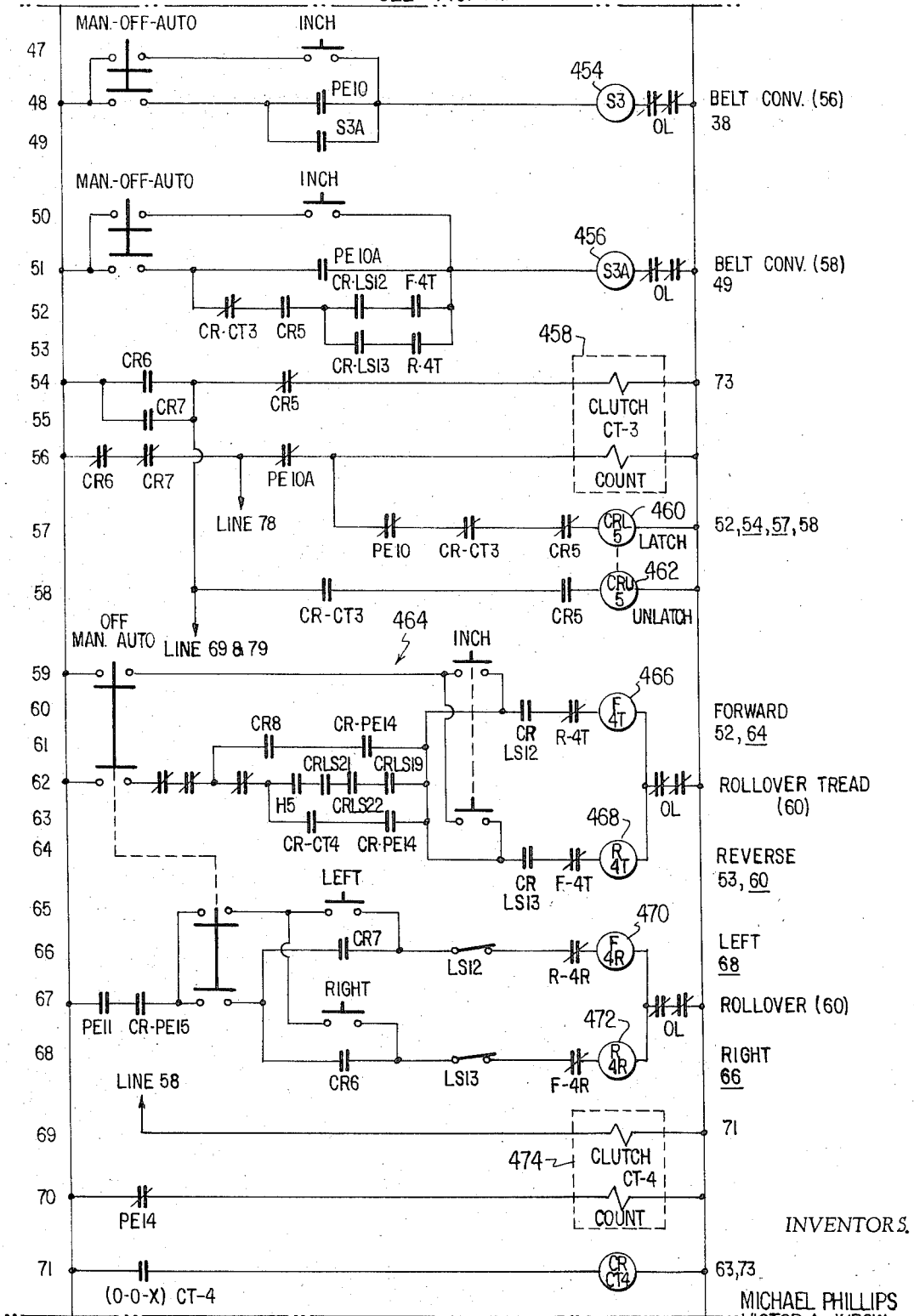
Figure 14D:
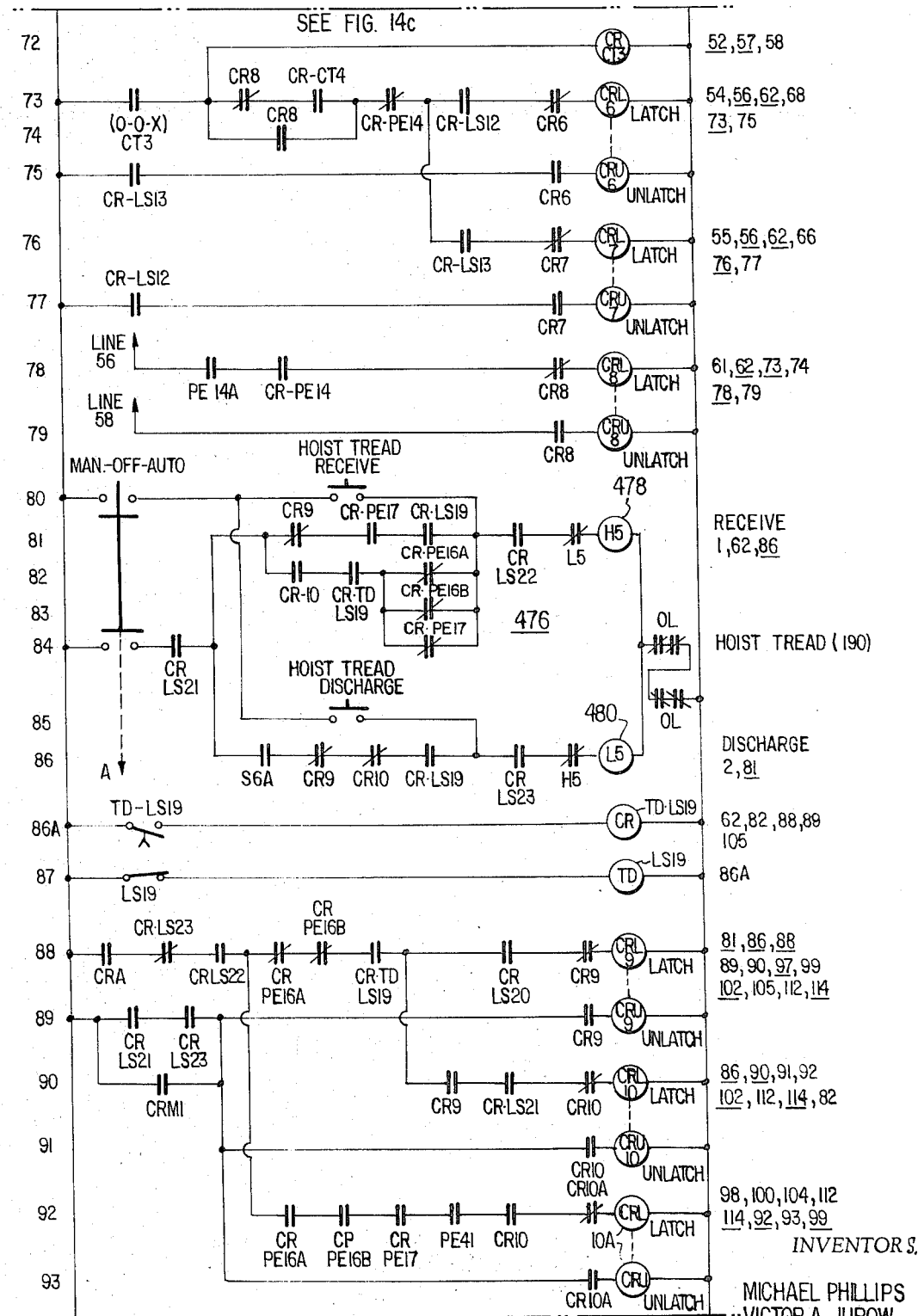
Figure 14E:
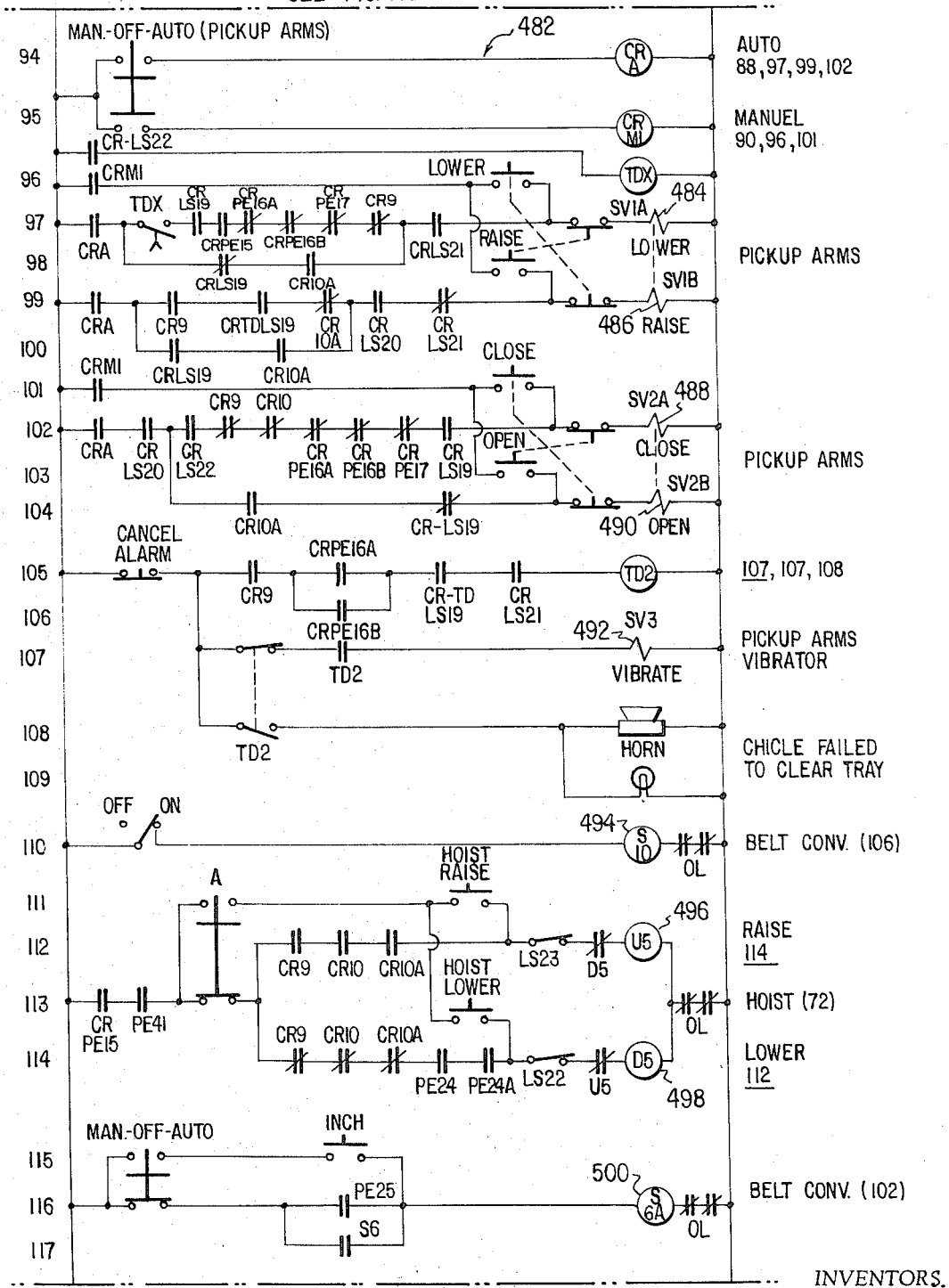
Figure 14F:
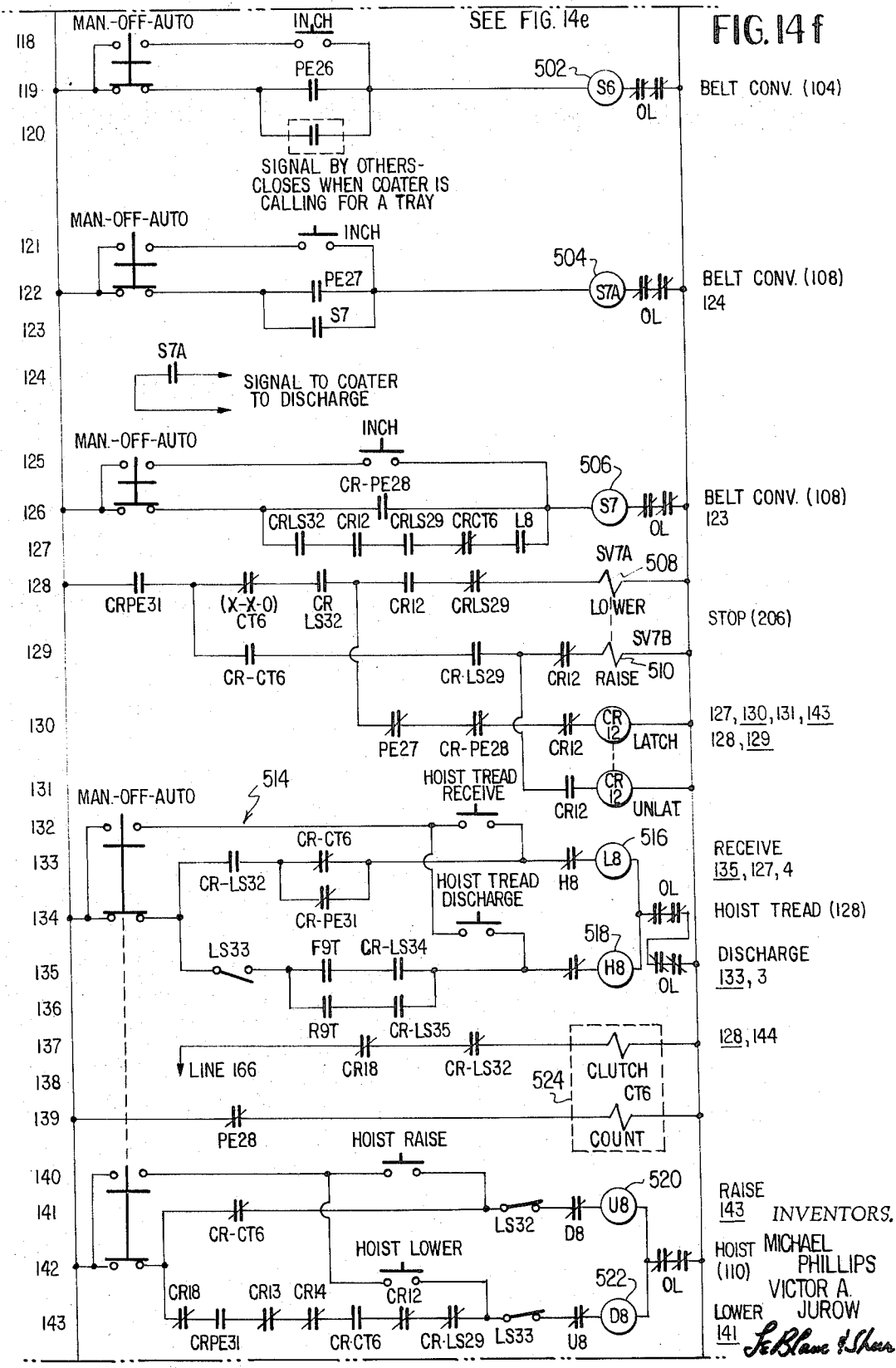
Figure 14G:
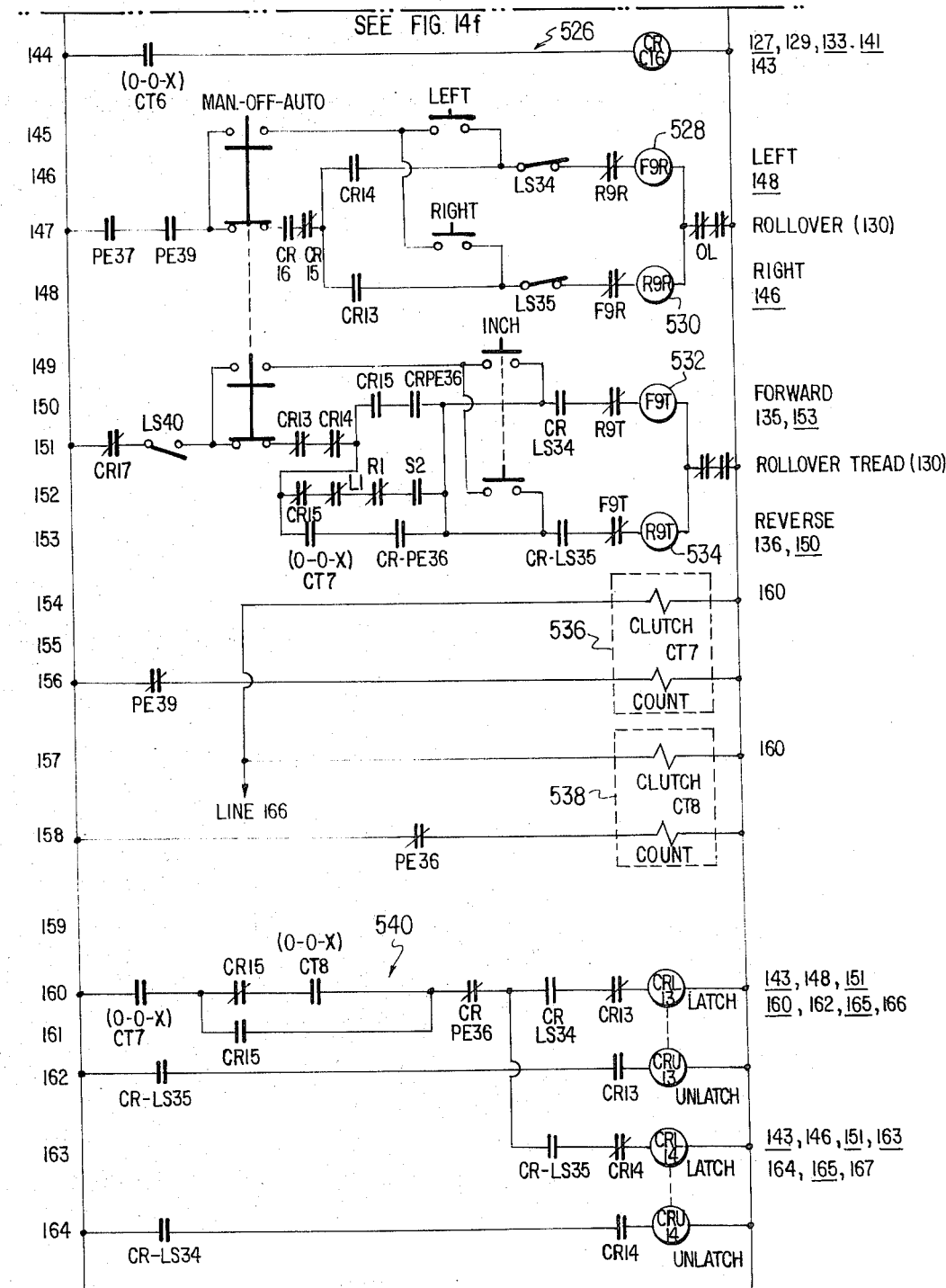
Figure 14H:
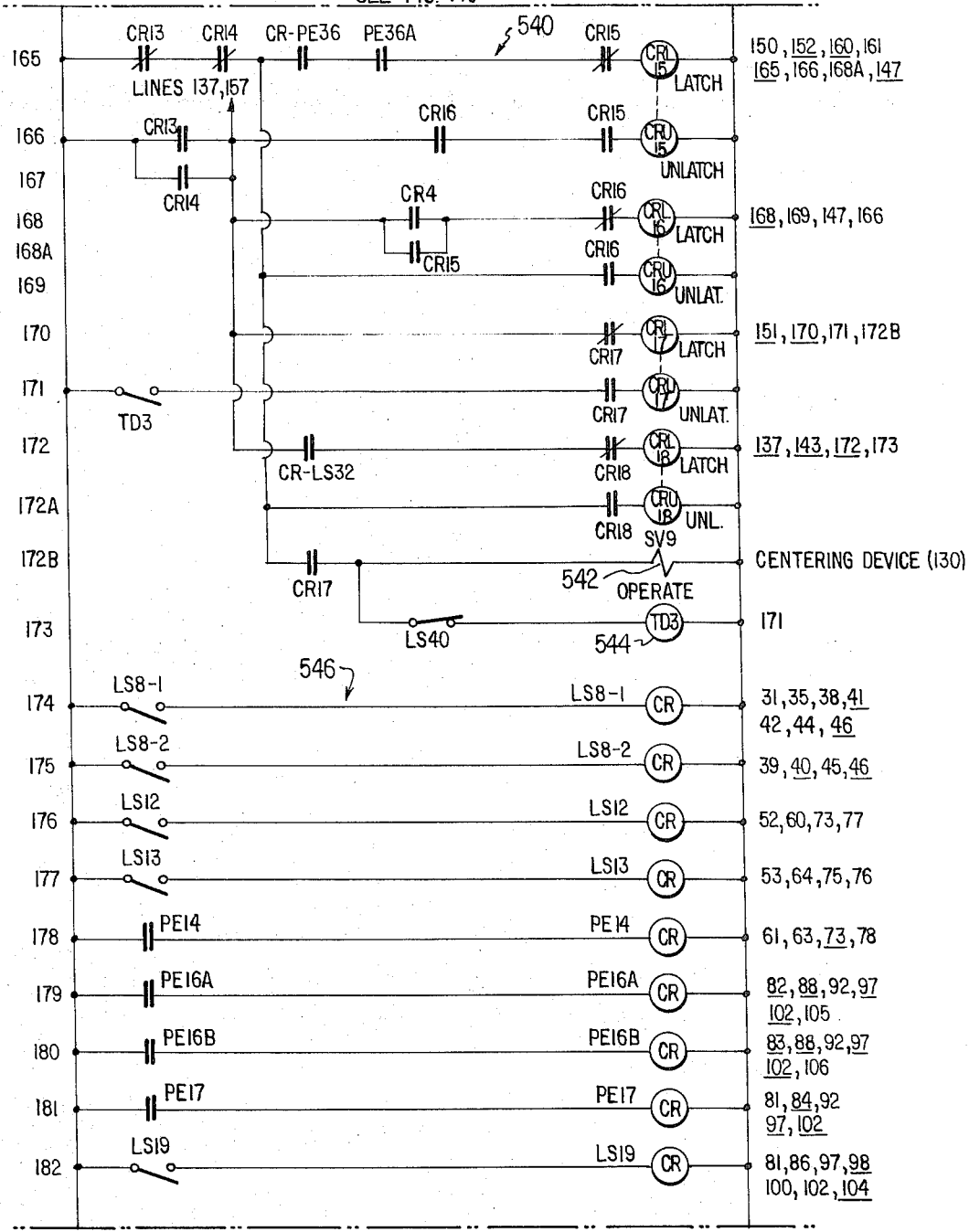

FIG. 13 shows a portion of a control panel 401. The panel is divided into six sections, namely, section 404 for controlling (a) the horizontal indexing of the carriage by screw 42, (b) the vertical position of the elevator 50 and (c) the operation of the chain conveyor 54. Also shown is section 406 for controlling the discharge lift 72. Section 408 controls return lift 110, section 410 is for the roll-overs, section 412 for the conveyor belts 56, 58, 102, 104, and 108, and section 414 controls the inclined conveyor 94. Various settings for the control button include OFF, where the respective unit is stopped, MANUAL OPERATION in which the control device may be manually moved, and an INCHING setting in which the control device moves only as long as the INCHING button is depressed. Automatic operation is, of course, when the unit runs unattended. Indexing section 404 includes a RUN or MACHINE IN OPERATION light 416 and a CYCLE COMPLETE light or indicator 418 on the panel for indicating these conditions of the machine. A horn sounds at the end of a complete cycle and this unit also includes a HORN RESET button 420. Control unit 406 for the lift 72 includes an indicator light 422 for indicating when the gum base block fails to clear the tray or pan when the tray or pan is raised by the hooks or grabbers. Only a single control unit 410 for the roll-overs is illustrated, it being understood that a second identical unit is provided so that there is one unit corresponding to panel unit 410 for each of the roll-overs 60 and 130. Similarly, only a single control unit 412 is illustrated for the conveyor belts, it being understood that a separate duplicate unit identical to that indicated at 412 is provided for each conveyor belt.

FIGS. 14a–14j, taken together and hereafter referred to collectively as FIG. 14, is a line diagram of the overall electrical control system for the unloader 10 of FIG. 1. In FIG. 14, the lines are numbered on the left-hand side from 1 to 221 and each line of the circuit is drawn so that the relay coil appears on the right-hand side of the line diagram. Outside the diagram on the right side various portions of the circuit are indicated by name with numbers in parentheses corresponding to the elements controlled by the circuit illustrated in FIG. 1. The remaining numbers on the right-hand side of the diagram refer to the line or lines in which the contacts appear that are operated by that relay. The underlined numbers refer to contacts that are normally closed and these are illustrated in the usual manner with a slash through the contact pairs. The items indicated with an asterisk, such as the control switches, are operated from or are located on the control panel 401 of FIG. 13. Lines 200 through 221 instead of illustrating coils or relays show the wiring diagram for the photoelectric light sources or light bulbs which, along with corresponding photoelectric relays, control portions of the circuit by detecting pan positions in the locations illustrated in FIG. 8.

Following is a list of definitions for some of the abbreviations appearing in FIG. 14;

BC — belt conveyor
BRK — brake
CC — chain conveyor
CR — relay coil
CRL — relay coil (latching)
CRU — relay coil (unlatching)
CT — counter
D — down (motor)
F — forward (motor)
H — high speed (motor)
L — low speed or lower (motor)
LS — limit switch
PE — photoelectric eye
R — reverse (motor)
S — starter (motor)
SV — solenoid valve
T — tread (conveyor belt motor)

TD — time delay
U — up (motor)

In FIG. 14, the input lines 402 and 404, labeled $IL_1$ and $IL_2$, are connected to a suitable power supply, such as a conventional 60 cycle, 440 volt commercial outlet. These lines connect directly to a circuit generally indicated at 406 for controlling the speed of the hoist conveyor belts 190 and 128. These belts are adapted to run at both a high speed and a low speed and are controlled by brake solenoids 408 and 410. The power supply is connected to the remainder of the circuit through a 3 KVA stepdown transformer 412 and fuse 414. The secondary of the transformer is connected to grounded lead 416 and to active lead 418. An additional lead 420 provides an active line to the photoelectric sources or light bulbs, generally indicated at 422 at the end of FIG. 14. The output from the transformer is 60 cycle, 110 volt electrical energy.

The portion of the circuit generally illustrated at 424 controls the movement of the carriage horizontal indexing mechanism, i.e., rotating screw 42. This includes a forward motor coil 426, a reverse motor coil 428, and a time delay coil 430. The time delay, after deenergization for coil 430, is set at approximately 2 seconds. A relay coil 432 for the drive motor is also connected in the circuit and it acts through a time delay to control the motor warmup. The carriage horizontal index mechanism is also provided with a relay coil 434 and an air solenoid valve coil 436 which latter coil controls a pressure cylinder operating the latch 40 of FIG. 1.

Vertical indexing, i.e., to upward and downward movement, of the carriage is controlled by a plurality of limit switches which the elevator actuates as it moves down and up into and out of the pit. These limit switches set to periodically stop and start motor 142 which raises and lowers the elevator. The circuit for this control is generally indicated at 438 in FIG. 14 and includes a lowering starter coil 440 for the motor and a rise starter coil 442. One of the counters for the vertical indexing, i.e., counter No. 1, is illustrated by the dashed box 444 and the counter is shown as included a clutch coil 446 and a count coil 448. The starter coil for the chain conveyor 54 is illustrated at 450 and counter No. 2 is shown by the dashed box 452. Starter coil 454 controls the drive motor for belt conveyor 56 and starter coil 456 controls the drive motor for the belt conveyor 58. A third counter 458 forms part of the control circuit for these two conveyor belts which circuit also includes the latching relay coil 460 and an unlatching relay coil 462.

The control circuit for roll-over 60 is generally indicated at 464 in FIG. 14 and this circuit includes forward and reverse starter coils 466 and 468 for the roll-over conveyor belts. Operation of the roll-over itself is under the control of forward starting coil 470 and reverse starting coil 472. A fourth counter 474 also forms a part of the control circuit for roll-over 60.

Belt 190 on the lift 72 is controlled by circuit 476 which includes a high speed coil 478 and a low speed coil 480. The remaining portions of this circuit form safety circuits and circuit interlocks for the remainder of the device. The pickup arms or vibrator arms are controlled by the portion of the circuit generally illustrated at 482 and this circuit includes a lower solenoid valve coil 484 and a raise solenoid valve coil 486 for controlling the air cylinder 276. These two solenoids are the solenoids of valve 366 of FIG. 11. Solenoid valve coils 488 and 490 act to open and close the pickup arms or hooks, while the pickup arm vibrators are actuated by operation of the vibrate solenoid valve coil 492. Starter coil 494 operates the motor for the coater 106 and lift 72 is raised and lowered in response to operation of the up coil 496 and the down coil 498. Belt conveyor 102 is operated by starter coil 500, belt conveyor 104 by starter coil 502, and roller conveyor 108, which is preferably made in two sections, is actuated by starter coils 504 and 506. Stop 206 is operated by solenoid valve coils 508 and 510.

Lift or hoist 110 is operated by the portion of the circuit generally indicated at 512 in FIG. 14. Belt 128 of the lift is controlled by a low speed coil 516 and a high speed coil 518. The lift elevator is raised in response to the operation of coil 520 and lowered by down coil 522 and its operation is under the control of counter 524. Roll-over 130 is controlled by the circuit generally indicated at 526, including a forward starting coil 528 and reverse starting coil 530, which act to control the roll-over 130 itself. The roll-over belts are controlled by forward coil 532 and reverse coil 534. Its operation is controlled by counters 536 and 538. Each of these counters, unless otherwise indicated, is preferably of type HZ-172A601 Eagle Cycl-Flex counters, and each includes both a clutch coil and a counting coil. Further, interlock circuitry is generally indicated at 540.

The optional centering device for roll-over 130, i.e., cylinder 296, is controlled by solenoid valve coil 542 which is connected in parallel with a time delay coil 544 which has its time delay after energization set at approximately 1 second. A plurality of relay coils, generally indicated at 546, provide additional control functions in response to operation of either limit switches or the closure of photoelectric (PE)contacts as illustrated. The photoelectric light sources which may give off visible light are illustrated at 422 as energized from active line 420 and grounded line 416.

In operation, when the carriage horizontal indexing mechanism is in the home position contacting limit switch LS-1 in FIG. 9, the operator pushes a carriage loaded with pans filled with gum base material in position where the indexing latch engages with the carriage. The operator presses the horizontal indexing mechanism index button 548 in FIG. 13 and this energizes time delay coil $TD_1$ which in turn energizes the indexing motor rotating screw 42 and indexing the carriage horizontally until the limit switch LS-2 is contacted. When limit switch LS-2 (FIG. 9) is contacted by latch mechanism 40, the first bank or tier of 16 trays or pans (eight rows or two pans each) is positioned over the chain conveyor 54 ready to be engaged by the conveyor and sent through the system.

The operator now sets counter 444 (CT-1) to seven counts and all other counters in the system to two counts. With the carriage in position over chain conveyor 54 at limit switch LS-2, the operator presses the system RUN pushbutton plus indicator light 416 of FIG. 13 to start the cycle for emptying the pans into the system and then back into the carriage. This energizes coil CR-2 on line 19 of the line diagram in FIG. 14 and CR-2 energizes motor 142 lowering the elevator 50 until limit switch LS-8-1 is contacted. The elevator is stopped and two trays or pans of the bottom tier are raised free of the support trails by the chain conveyor 54. Providing that the belt conveyor 56 is running, limit switch LS-8-1 energizes start coil 450 (line 39 of the line diagram) running the chain conveyor 54. The trays on the chain conveyor move forward and contact limit switch LS-38 (FIG. 8) and limit switch LS-38 energizes counter 452 (CT-2) count coil. When the first tray or pan clears limit switch LS-38, this deenergizes the CT-2 count coil advancing the counter one count. The two trays move onto conveyor belt 56 and when the second tray clears limit switch LS-38, the counter CT-2 is advanced 2 counts. The counter now counts out stopping chain conveyor 54. When the second of the two trays clears photoelectric eye PE-9 in FIG. 8, counter CT-2 energizes starter coil 440 (L-1) further lowering the elevator 50. When the elevator lowers far enough to clear limit switch LS-8-1, counter CT-1 advances one count and the counter CT-2 clutch coil is energized resetting this counter. With counter CT-2 reset, the elevator stops when limit switch LS-8-1 is contacted.

The elevator cycle continues and two pans are unloaded at each tier as described above until the elevator and carriage are indexed down to the seventh position. The cycle for the eighth or last position is described below. Conveyor belts 56 and 58 run continuously when empty. When a pair of trays are discharged onto these conveyors from chain conveyor 54 as described above, the first tray or pan stops on conveyor belt 58 when photoelectric eye PE-10A is interrupted. Conveyor 56 continues to run until the second tray interrupts photoelectric eye PE-10, stopping this conveyor belt. With trays at photoelectric eye PE-10 and PE-10A, and providing that counter CT-3 (counter 458) is not counted out, photoelectric eyes PE-10 and PE-10A energize latching relay CRL-5, latching in the CR-5 contacts. Assuming roll-over 60 is empty, photoelectric eyes PE-14 and PE-14A energize relay CRL-8, latching in the CR-8 contacts. Contacts CR-8 then energize either coil 466 or coil 468 (F-4T or R-4T) depending on what position the roll-over is in, i.e., contacting limit switch LS-12 or limit switch LS-13. It is assumed taht the roll-over is rotated so that limit switch LS-12 is contacted. Thus, coil F-4T is energized running the roll-over belts in the forward direction. With CR-5 contacts latched in and the roll-over belts running, starting coil S-3A (456) is energized and in turn it energizes starting coil 454 (S-3) running conveyor belts 56 and 58. The trays on these conveyors then run forward into the roll-over.

When the first tray on belt 58 clears PE-10A, the count coil of counter CT-3 is deenergized, advancing this counter one count. When the second tray interrupts photoelectric eye PE-10A and clears it, counter CT-3 counts out. Conveyor belt 58 continues to run until a tray interrupts photoelectric eye PE-10A. The two trays fed onto the roll-over move forward until the leading one interrupts photoelectric eye PE-14. With counter CT-3 now counted out, photoelectric eye PE-14 energizes relay CRL-6, latching in CR-6 contacts. These contacts unlatch the relay CR-8 contacts and energize counter CT-3 clutch coil, resetting this counter. Providing that photoelectric eyes PE-11 and PE-15 are clear of a tray, contacts CR-6 energize coil 472 (R-4R), rotating the roll-over to the right until limit switch LS-13 is contacted. Limit switch LS-13 now energizes relay CRU-6, unlatching CR-6 contacts.

Providing that the elevator of lift 72, i.e., elevator 88, is lowered contacting limit switch LS-22 and its clamp arms are raised and open as indicated by limit switches LS-19 and LS-21, high speed coil 478 (H-5) is energized, running the lift belt or tread 190 at high speed. With the roll-over cycle complete as described above, CR-6 and CR-7 contacts are clear. With a pair of trays in the roll-over, relay CRL-8 will not be energized as described above. Therefore, coil H-5 now energizes coil R-4T, running the roll-over belts in the forward direction. The pair of trays in the roll-over move forward in the inverted position onto lift belt 190. If conveyor belts 56 and 58 contain trays, these now move into the roll-over 60 when the roll-over tread is running. When the first tray on the roll-over clears photoelectric eye PE-14, counter CT-4 count coil is deenergized, advancing counter CT-4 one count. When the second tray in the roll-over interrupts PE-14, this energizes counter CT-4 count coil. After the tray clears photoelectric eye PE-14, the count coil is deenergized, advancing the counter one more count. Since the counter was set to two, it counts out. This allows the roll-over conveyor belts to run until photoelectric eye PE-14 is again interrupted by a tray. The trays discharge onto lift belt 190 and run to photoelectric eye PE-17. When PE-17 is interrupted, this stops the lift belt 190. With the roll-over belts running, conveyor belts 56 and 58 will also continue to run until these conveyors feed two trays into the roll-over 60. When this happens, counter CT-3 counts out as described above. Conveyor belts 56 and 58 will now run until photoelectric eyes PE-10 and PE-10A are interrupted as described above. With counter CT-4 counted out, the roll-over belts or treads run until photoelectric eye PE-14 is interrupted. When this happens, with counter CT-3 and counter CT-4 counted out and the roll-over contacting limit switch LS-13, relay CR-7 is energized, latching in CR-7 contacts.

Providing that photoelectric eyes PE-11 and PE-15 are now clear of a tray, relay CR-7 energizes coil F-4R, rotating the roll-over 60 until limit switch LS-12 is contacted. Limit switch LS-12 stops the roll-over and energizes relay CRU-7, unlatching the CR-7 contacts, completing the roll-over cycle.

With a pair of trays now on the lift belt 190 and the leading one interrupting photoelectric eye PE-17, solenoid valve coil SV-1A is energized, lowering the clamp or grabber arms. When the clamp arms are completely lowered, limit switch LS-20 is contacted. Limit switch LS-20 energizes solenoid valve coil SV-2A, closing the clamp arms. When the clamp arms close far enough to release limit switch LS-19, time delay limit switch TD-LS-19 is energized after a time delay long enough for all closing arms to close and the time delay limit switch TD-LS-19 times out. When this happens, relay CRL-9 is energized, latching in CR-9 contacts. These contacts energize solenoid valve coil SV-1B, raising the clamp arms. When the clamp arms rise, they raise the tray away from the gum base material which remains resting on lift conveyor belt 190. When the clamp arms reach the raised position, limit switch LS-21 is contacted,- latching in relay CR-10 contacts. When this happens and if the gum base has not separated from the tray as indicated by photoelectric eyes PE-16 and PE-16A, time delay coil TD-2 is energized. Coil TD-2 in turn energizes solenoid valve coil SV-3, operating the clamp vibrators. If the gum base material does not clear the tray after a time delay, coil TD-2 times out, deenergizing solenoid valve coil SV-3, stopping the vibrator. Coil TD-2 also now sounds the warning horn indicating that a tray has been raised and the gum base has not separated from the tray.

Assuming that the chicle or gum base has separated from the tray and when this happens and the clamp arms are raised with a tray, photoelectric eyes PE-16A and PE-16B energize relay CRL-10, latching in the CR-10 contacts. Contacts CR-10 energize coil 478 (H-5), running the lift conveyor belt 190 at high speed. The tray on the conveyor belt moves forward onto inclined conveyor belt 94. When the gum base block moves far enough to clear photoelectric eyes PE-16, PE-16A, PE-17 and PE-41, this energizes relay CRL-10A, latching in the CR-10A contacts. Relay CR-10A energizes coil U-5 (496), raising the elevator of lift 70 to its uppermost position until limit switch LS-22 is contacted. While the lift is being raised, relay CR-10A energizes solenoid valve coil SV-1A, lowering the clamp arms and the tray onto belt 190. When the clamp arms are completely lowered, limit switch LS-20 is contacted. This limit switch energizes solenoid valve coil SV-2B, opening the clamp arms and depositing the empty tray on belt 190. When the clamp arms are open, limit switch LS-90 is contacted and it energizes solenoid valve coil SV-1B, raising the clamp arms. When the elevator of the lift reaches its top position, limit switch LS-23 stops the elevator and energizes relays CRU-9, CRU-10, and CRU-10A, unlatching the relay contacts. With CR-9, CR-10 and CR-10A contacts unlatched, the lift raised with a pair of trays and the clamps raised and open, coil L-5 (coil 480), if belt 102 is running, runs the elevator belt 190 at low speed. The tray on belt 190 moves forward onto belt 102. When the tray clears belt 190 as indicated by photoelectric eye PE-24 and PE-24A being clear, PE-24 and PE-24A energize coil D-5 (coil 498), lowering the lift elevator until limit switch LS-22 is contacted, completing the lift cycle.

Belt conveyors 102 and 104 run continuously when empty. When a tray interrupts photoelectric eye PE-26, this stops conveyor belt 104 if the coater 106 is not running. When the coater is running, it overrides photoelectric eye PE-26 operating conveyor belt 104. When conveyor belt 104 is not running, conveyor belt 102 will run until a tray interrupts photoelectric eye PE-25. Conveyor 102 runs continuously if conveyor belt 104 is running.

The two drive motors for roller conveyor 108 run continuously when empty. When the upstream section of the roller conveyor is running, this signals the coater 106 to run. When the coater discharges a tray onto the upstream section of roller conveyor 108, the tray runs onto the downstream section until photoelectric eye PE-28 is interrupted. This stops the downstream section. With a tray on the downstream section interrupting photoelectric eye PE-27, the upstream section will continue to run until the next tray discharged onto this conveyor interrupts photoelectric eye PE-27.

When the elevator 126 of lift 110 is raised, limit switch LS-32 is contacted. Providing the elevator is empty, coil L-8 (516) is energized. This coil runs the conveyor belt 128 at low speed. With a tray at photoelectric eye PE-27 and photoelectric eye PE-28, control relay CRL-12 is energized, latching in the relay contact. The CR-12 contacts now lower stop 206. With the stop lowered, relay CR-12 energizes starting motor S-7 (506), causing the downstream section of roller conveyor 108 to operate. Starting coil 506 in turn energizes starting coil S-7A (504), also running the upstream section of the roller conveyor. The trays on roller conveyor 108 run forward onto the lift elevator belt 128. When the first tray clears photoelectric eye PE-28, the count coil of counter CT-6 is denergized, advancing the counter one count. When the next tray on belt conveyor 128 interrupts photoelectric eye PE-28 and energizes the count coil of counter CT-6 and deenergizes it, the counter CT-6 advances to the second count. The counter now counts out. Roller conveyor 108 continues to run until photoelectric eye PE-28 is again contacted.

When the last tray discharges onto lift conveyor 128, it clears photoelectric eye PE-31 with counter CT-6 counted out and solenoid valve SV-7B and relay CRU-12 being energized. Solenoid valve SV-7B raises stop 206 and coil CRU-12 unlatches the CR-12 relay contact. When the stop 206 is raised, limit switch LS-29 is cleared and this limit switch now energizes down coil D-8 (522), lowering the lift elevator 126 until limit switch LS-33 is contacted.

With the lift in the lowermost position, it is assumed that the roll-over 130 is empty. Photoelectric eyes PE-36 and PE-36A energize coil CRL-15, latching in the CR-15 contacts and relay CR-15 energizes either coil F-19 or R-19 driving the roll-over belts either in the forward or reverse directions, depending upon whether the roll-over is in a position to contact limit switch LS-34 or LS-35. Assuming the roll-over is in a position contacting limit switch LS-34, coil F-9T is energized, running the roll-over belts in the forward direction. The trays on the lift belt now run forward and interrupt photoelectric eye PE-39 and this photoelectric eye energizes the count coil of counter CT-7. When the tray clears photoelectric eye PE-39, this deenergizes the count coil of the counter, advancing the counter one count. When the second tray clears photoelectric eye PE-39, this advances counter CT-7 to the second count and the counter counts out. The two trays discharge into the roll-over, run forward on the roll-over belt until the leading tray interrupts photoelectric eye PE-36. When this happens and since counted CT-7 is counted out, coil CRL-13 is energized, latching in the CR-13 contacts. Relay CR-13 now energizes coil CRU-15, latching in the CR-15 contacts. Relay CR-13 also energizes clutch coils of counters CT-6 and CT-6, resetting the counters, and energizes coil R-9R (530), rotating the roll-over until limit switch LS-35 is contacted.

By the time that two empty pans are positioned in the roll-over ready for return to the carriage, the carriage elevator 50 has moved downwardly and seven pairs of trays have been discharged into the system. The elevator is now in its 8th position ready to discharge the last two pairs of trays and is contacting limit switch LS-8-1. In this position, relay CRL-3 is energized as described above, latching in the CR-3 contacts.

When belt conveyor 56 runs forward, coil S-3 energizes coil S-2 operating chain conveyor 54. Coil S-2 (450) in turn energizes coil R-19 (if the roll-over 130 is at limit switch LS-35), running the roll-over belts. With lift elevator 126 lowered and now empty, coil R-19 energizes coil H-8, running the elevator belt 128 at high speed. Thus, conveyor belt 56, chain conveyor 54, and lift elevator belt 128 and the belt in roll-over 130 all now run as a unit. The empty trays on the lift belt move into the roll-over and the trays in the roll-over move up onto the chain conveyor 54. The lift discharge cycle is the same as that previously described, except that relay CRL-8 does not function since a pair of trays are already in the roll-over. When the pair of empty trays clear the lift belt, counter CT-7 counts out as described above. The trays that were in the roll-over 130 move onto the chain conveyor 54. When the leading tray in the roll-over clears photoelectric eye PE-36, this energizes the count coil of counter CT-8, advancing this counter one count. When the second tray in the roll-over interrupts photoelectric eye PE-36 and clears it, counter CT-8 is energized and then deenergized, advancing the counter to two counts. The counter CT-8 now counts out. Since counter CT-7 is counted out by the trays fed from the lift, the roll-over tread or belts continue running until the leading tray fed into the roll-over interrupts photoelectric eye PE-36, energizing relay CRL-14 coil, and relay CR-14 returns the lift to receive new trays.

When the full trays that were on the chain conveyor 54 when the eighth carriage discharge cycle was started move onto belt conveyor 56 and advance counter CT-2 as described above, and the leading tray discharged by the roll-over contacts limit switch LS-38, relay coil CRL-4 is energized, latching in the CR-4 contacts. Relay CR-4 energizes coil CRL-16, latching the roll-over into receive position as described above. Relay CR-4 now energizes coil R-1, raising the carriage elevator until limit switch LS-8-2 is contacted. When the carriage elevator clears limit switch LS-8-1, this energizes coil CRU-4, unlatching the CR-4 contacts.

From this point on, the 14 remaining trays in the system will not go beyond limit switch LS-38. They are fed into the carriage by way of chain conveyor 54. The operation is similar as described above and may be summarized as follows: When the leading tray fed into the chain conveyor 54 contacts limit switch LS-38 and counter CT-8 is counted out, coil CRL-4 is energized, latching in the CR-4 contacts. Providing photoelectric eyes PE-9 and PE-37 are clear, the carriage elevator indexes upward one space until limit switch LS-8-2 is contacted. This cycle repeats until the bank or tier of the carriage becomes filled with empty trays. When this happens and the carriage elevator reaches limit switch LS-6, relay CR-2 is deenergized, completing the carriage fill cycle. Relay LS-6 also sounds a horn and lights the pilot light indicating this condition. The horn can be silenced by the operator pressing the HORN RESET button. After the third bank or tier of the carriage has been processed, the operator returns the horizontal indexing mechanism to the hold position by pressing the RETURN button. This energizes relay CR-1 and this relay energizes solenoid valve coil SV-1, raising the latch 40. When the latch is completely raised, limit switch LS-5 is contacted and this in turn energizes coil R-1A, returning the horizontal indexing mechanism to the home position until limit switch LS-1 is contacted. This limit switch also deenergizes coil SV-1, lowering the latch. The unloaded carriage filled with empty pans is rolled down the rail 18 away from the pan unloader and a new carriage with full trays is inserted into the machine.

It is apparent from the above that the present invention provides an improved and completely automatic system for (a) removing pans from a carriage, (b) emptying the pans, (c) coating the pans with a release agent, and (d) automatically reloading the empty pans into the carriage. While the system has been described in conjunction with the emptying of pans filled with gum base material, which has been cooled and allowed to solidify, it is apparent that the present invention finds use with all types of material processing operations where pans filled with material must be emptied. The present invention is particularly adapted to chewing gum base operations where the fully loaded pans each weigh in the neighborhood of 100 pounds and where, because of the size and weight of the pans, manual emptying is quite difficult. An additional feature of the machine resides in the pneumatically operated hooks or grabbers which lift the inverted pans away from the gum base material to empty the trays and which may be vibrated to insure separation of the metal pans from the chicle or chewing gum base. Pan inversion and return to the upright position is effected through the use of a pair of roll-overs which comprise a pair of spaced conveyor belts which retain the pans during inversion. Space is conserved in the machine by providing operations at two different levels and interconnecting the two levels by a pair of lifts. Both vertical and horizontal indexing is utilized to permit the unloading of successive tiers of pans in the carriage and to remove pairs of pans which are conventionally supported at eight different levels in the carriage. Vertical indexing is effected by lowering and raising the carriage on an elevator provided with an integral overhead rail, which communicates with the conventional overhead rail in the factory, along which the carriages are manually propelled.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pan unloader comprising an elevator for supporting a plurality of pans to be emptied, said pans being arranged in vertically spaced levels in said elevator, a conveyor beneath said elevator and adapted to pass into said elevator when said elevator is lowered to engage and remove the loaded pans through one side of the elevator, means adjacent said conveyor for receiving the pans discharged from said conveyor and emptying the same, means for conveying the empty pans back to a feeding station located on another side of said elevator relative to said one side thereof, and means at said feeding station to feed said empty pans into said elevator.

2. A pan unloader according to claim 1 including means adjacent said conveyor for inverting loaded pans discharged from said conveyor and elevator.

3. A pan unloader according to claim 1, a carriage adapted to carry a plurality of pans in said vertically spaced levels, drive means coupled to said elevator, and vertical indexing means coupled to said drive means for lowering said elevator in steps whereby said conveyor removes the vertically spaced pans carried by said carriage in sequence from the lower to the upper levels.

4. A pan unloader according to claim 3 wherein said vertical indexing means includes means for raising said elevator in corresponding steps.

5. A pan unloader according to claim 4 wherein said vertical indexing means comprises a plurality of limit switches with actuators lying in the path of movement of a portion of said elevator.

6. A pan unloader comprising an elevator, means on said elevator for supporting a carriage loaded with pans to be emptied, a conveyor beneath said elevator and adapted to engage and remove pans from said carriage as said elevator is lowered, a first roll-over adjacent one end of said conveyor for receiving and inverting pans from said conveyor, means adjacent said first roll-over for emptying inverted pans, and a second roll-over adjacent the other end of said conveyor for reinverting empty pans and passing them back onto said conveyor for reloading on said carriage as said elevator is raised.

7. A pan unloader according to claim 6 including conveying means above said elevator, a first lift adjacent said first roll-over for lifting pans from said first roll-over to said conveying means, and a second lift adjacent said second roll-over for lowering pans from said conveying means to said second roll-over.

8. A pan unloader according to claim 7 wherein said first and second lifts both include conveyor belts.

9. A pan unloader according to claim 8 wherein the conveyor belts on said lifts are reversible in direction.

10. A pan unloader according to claim 9 including a gum base discharge conveyor adjacent said first lift.

11. A pan unloader according to claim 10 including a plurality of hooks on said first lift overlying the lift belt, and means coupled to said hooks for raising and lowering them relative to the belt on said first lift.

12. A pan unloader comprising a floor with a pit, an elevator vertically movable into and out of said pit, a pan carriage support rail on said elevator, horizontal indexing means on said elevator for indexing a carriage on said rail in horizontal steps relative to said elevator, vertical indexing means coupled to said elevator for moving said elevator in vertical steps into and out of said pit, a conveyor above said pit and adapted to be received in said elevator as said elevator is lowered into said pit, first conveyor means adjacent one end of said conveyor for receiving pans from said conveyor, second conveyor means adjacent the other end of said conveyor for supplying pans to said conveyor, and means for emptying the pans between said first and second conveyor means.

13. A pan unloader according to claim 12 wherein said first and second conveyor means each include pan inverters.

14. A pan unloader according to claim 12 wherein said conveyor comprises a chain conveyor, and a pedestal in said pit supporting said conveyor.

15. A pan unloader according to claim 12 wherein said horizontal indexing means comprises a carriage latch and screw mounted on said elevator, and a plurality of limit switches on said elevator with actuators lying in the path of movement of said carriage latch.

16. A pan unloader according to claim 12 wherein said vertical indexing means comprises a drive motor in said pit, a plurality of belts coupling said motor to said elevator, and a plurality of limit switches in said pit with actuators lying in the path of movement of said elevator.

17. A pan unloader according to claim 12 including a pan carriage depend from said rail in said elevator, and a plurality of pans supported in said carriage by flanges along two upper edges of each pan.

18. A pan unloader according to claim 17 wherein said pans are in three columns, each column comprising eight pairs of pans.

19. A pan unloader according to claim 18 wherein said pans are gum base cooling pans.

20. A pan unloader according to claim 1 including an overhead carriage rail mounted on said elevator, a carriage mounted for movement along said rail and adapted to carry a plurality of pans, and horizontal indexing means on said elevator for indexing said carriage along said rail for aligning the pans carried thereby with said conveyor.

21. A pan unloader comprising an elevator for supporting pans to be emptied, a conveyor beneath said elevator and adapted to pass into said elevator when said elevator is lowered to engage and remove the loaded pans from the elevator, means adjacent said conveyor for receiving the pans discharged from said conveyor and emptying the same, means adjacent said conveyor for feeding empty pans back onto said conveyor, means for conveying the empty pans from said receiving means to said feeding means, means adjacent said conveyor and elevator for inverting loaded pans discharged from said conveyor, means adjacent said conveyor and elevator for inverting loaded pan discharged from said conveyor, and a second inverter adjacent said conveyor and elevator for reinverting the pans after they have been emptied.

22. A pan unloader comprising an elevator for supporting pans to be emptied, a conveyor beneath said elevator and adapted to pass into said elevator when said elevator is lowered to engage and remove the loaded pans from the elevator, means adjacent said conveyor for receiving the pans discharged from said conveyor and emptying the same, means adjacent said conveyor for feeding empty pans back onto said conveyor, mean for conveying the empty pans from said receiving means to said feeding means, an overhead carriage rail mounted on said elevator, an overhead carriage rail mounted on said elevator, a carriage mounted for movement along said rail and adapted to carry a plurality of pans, and horizontal indexing means on said elevator for indexing said carriage along said rail for aligning the pans carried thereby with said conveyor, said horizontal indexing means comprising a latch for engaging a carriage supported on said rail, and a rotatable screw for moving said latch parallel to said rail.

* * * * *

UNITED STATES PATENT OFFICE
CERTIFICATE OF CORRECTION

Patent No. 3,779,410          Dated December 18, 1973

Inventor(s) Michael Phillips and Victor A. Jurow

It is certified that error appears in the above-identified patent and that said Letters Patent are hereby corrected as shown below:

Col. 8, last line, "base 330" should read --base 300--.
Col. 10, line 10, "them" should read --then--.
Col. 13, line 32, "to" should read --the--; line 36, "set" should read --act--; line 40, "rise" should read --raise--.
Col. 14, line 53, "rows or two" should read --rows of two--
Col. 15, line 39, "taht" should read --that--.
Col. 20, line 59, claim 2, "conveyor" should read --conveyor and elevator--; line 60, "conveyor and elevator" should read --conveyor--.
Col. 22, line 8, claim 17, "depend" should read --depending--

Signed and sealed this 17th day of June 1975.

(SEAL)
Attest:

RUTH C. MASON
Attesting Officer

C. MARSHALL DANN
Commissioner of Patents
and Trademarks